(12) United States Patent
Cassanelli et al.

(10) Patent No.: US 10,329,036 B2
(45) Date of Patent: Jun. 25, 2019

(54) DEVICE FOR THE HOLD-DOWN AND CONTROLLED RELEASE OF SPACE SATELLITES INSTALLED ON LAUNCHERS AND LOADS INSTALLED ON SPACE SATELLITES

(71) Applicant: AEREA S.p.A., Turate (Como) (IT)

(72) Inventors: Ruggero Cassanelli, Arluno (IT); Ivo Aliverti, Induno Olona (IT); Luca Andrea Pernechele, Sesto San Giovanni (IT)

(73) Assignee: AEREA S.P.A., Turate (Como) (IT)

( * ) Notice: Subject to any disclaimer, the term of this patent is extended or adjusted under 35 U.S.C. 154(b) by 301 days.

(21) Appl. No.: 15/380,428

(22) Filed: Dec. 15, 2016

(65) Prior Publication Data

US 2017/0174369 A1 Jun. 22, 2017

(30) Foreign Application Priority Data

Dec. 16, 2015 (IT) .................. 102015000084151

(51) Int. Cl.
*B64G 1/64* (2006.01)
*F16B 37/08* (2006.01)

(52) U.S. Cl.
CPC ............. *B64G 1/645* (2013.01); *B64G 1/641* (2013.01); *F16B 37/0864* (2013.01)

(58) Field of Classification Search
CPC .......... B64G 1/222; B64G 1/64; B64G 1/645; B64G 1/641; F16B 37/0864
See application file for complete search history.

(56) References Cited

U.S. PATENT DOCUMENTS

| 3,813,984 A | 6/1974 | Selinder |
| 3,926,090 A | 12/1975 | Bunker |
| 5,245,738 A | 9/1993 | Johnson |

(Continued)

FOREIGN PATENT DOCUMENTS

| DE | 202004018891 U1 | 3/2005 |
| EP | 1191271 A2 | 3/2002 |

(Continued)

OTHER PUBLICATIONS

Italian Search Report, completed on Aug. 5, 2016, for corresponding Italian Patent Application No. IT UB20159136 (102015000084151).

*Primary Examiner* — Magdalena Topolski
(74) *Attorney, Agent, or Firm* — Heslin Rothenberg Farley & Mesiti P.C.; Victor A. Cardona, Esq.

(57) ABSTRACT

A device for the hold-down and controlled release of space satellites installed on launchers and loads installed on space satellites, includes a blocking member made up of segments radially displaceable from a mutually approached retaining position to a mutually spaced-apart release position of a connecting screw. In order to control the radial displacement of the segments between the retaining position and the release position there are provided a rotatable element coaxial with the blocking member, an articulated mechanism which operatively connects the rotatable element with the segments of the blocking member, and linear motors for driving the controlled rotation of the rotatable element and, through the articulated mechanism, the simultaneous displacement of the segments of the blocking member.

20 Claims, 23 Drawing Sheets

(56) References Cited

U.S. PATENT DOCUMENTS

| | | | |
|---|---|---|---|
| 6,352,397 B1 | 3/2002 | O'Quinn et al. | |
| 6,450,064 B1 * | 9/2002 | Christiansen | B64G 1/645 403/343 |
| 6,525,920 B2 | 2/2003 | Rudoy et al. | |
| 6,661,331 B2 * | 12/2003 | Valembois | B64G 1/222 337/159 |
| 9,870,022 B2 * | 1/2018 | Rudoy | B64G 1/222 |
| 2003/0076215 A1 | 4/2003 | Baghdasarian | |
| 2009/0317174 A1 * | 12/2009 | Baghdasarian | B64G 1/645 403/2 |
| 2015/0167801 A1 | 6/2015 | Bonfiglio et al. | |
| 2016/0290323 A1 * | 10/2016 | Cassanelli | B64G 1/222 |
| 2017/0284443 A1 * | 10/2017 | Von Alberti | B64G 1/62 |

FOREIGN PATENT DOCUMENTS

| | | |
|---|---|---|
| GB | 1147227 | 4/1969 |
| GB | 2196404 A | 4/1988 |
| GB | 2373554 A | 9/2002 |
| WO | 2005/103510 A2 | 11/2005 |
| WO | 2009/138625 A2 | 11/2009 |
| WO | 2012/021911 A1 | 2/2012 |
| WO | 2014/013442 A1 | 1/2014 |
| WO | 2014/013443 A1 | 1/2014 |

\* cited by examiner

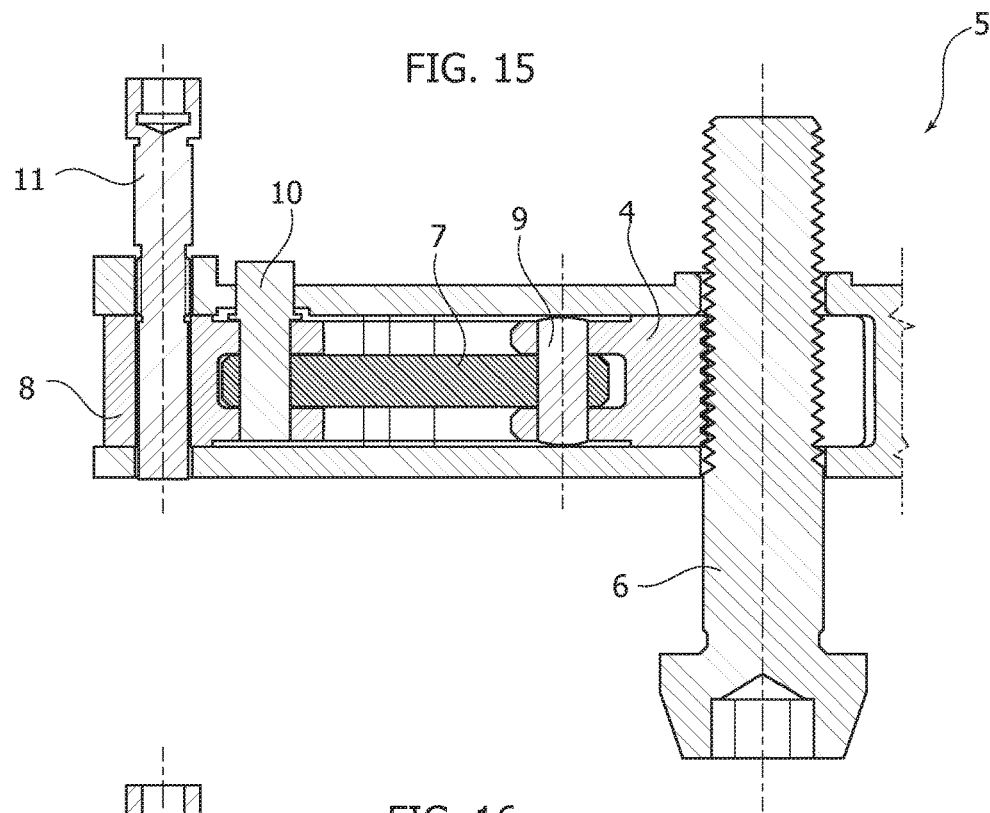
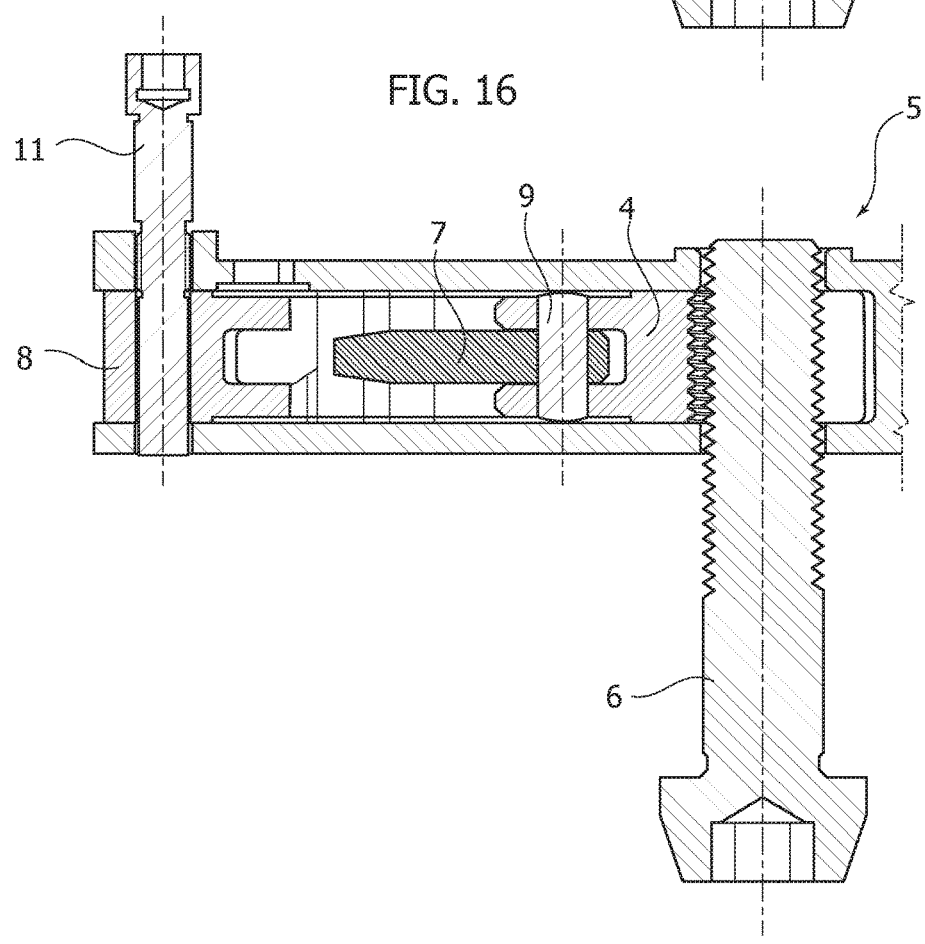

DEVICE FOR THE HOLD-DOWN AND CONTROLLED RELEASE OF SPACE SATELLITES INSTALLED ON LAUNCHERS AND LOADS INSTALLED ON SPACE SATELLITES

CROSS-REFERENCE TO RELATED APPLICATIONS

This application claims priority to Italian Patent Application No. 102015000084151 filed on Dec. 16, 2015, the entire disclosure of which is incorporated herein by reference.

FIELD OF THE INVENTION

The present invention regards devices for the hold-down and controlled release of space satellites installed on launchers and loads installed on space satellites. Devices thus made have the function of retaining the load during the launch and obtaining lift-off into space.

STATE OF THE PRIOR ART

Various devices, referred to as HDRM ("Hold-Down Release Mechanism"), that utilise pyrotechnic charges, devices for cutting wires, shape memory alloy wires, electromagnetic wires, thermal fuse thrusters, thermal knives, magnetic retentions and piezoelectric actuators, have been proposed.

These devices share one or more of the drawbacks summarised below:
- actuation characterised by high mechanical shock, which may potentially affect the functionality of the instruments on board the satellite,
- release of material (solid, liquid or gaseous) that is pollutant and potentially harmful for the on-board optical apparatus,
- storage and use challenges,
- need to reset after every actuation and this having to be done by the manufacturer, thus affecting costs, times and reliability,
- need to replace parts after every actuation, equally affecting costs, times and reliability,
- limited number of actuations and ensuing limitation of pre-flight tests,
- expensive verification of the hold-down pre-load level and the ensuing occurrence of uncertainty elements.

There have also been proposed HDRM devices in which the engagement of a hold-down screw requires a nut made up of segments radially displaceable from a mutually approached retaining position to a mutually spaced-apart release position of the screw, and in which there are provided actuator means for controlling the radial displacement of the nut segments from the retaining position to the release position.

Systems of this type are described and illustrated, for example, in documents EP-1680607, in which the nut segments are retained by a cam ring whose rotation, driven by linear or rotary electric motors or by pre-loaded spring plungers, enables opening the segments; EP-2279120, in which the nut segments can be elastically diverged and they are radially fastened by means of a hollow tensioner whose release is controlled by an actuator; EP-2605968, in which the nut is replaced by a sleeve formed by at least two parts that delimit a seat in which there is engaged the spherical head of a connection bar, and the two parts are fastened to each other through a spiral plate connected to a release device; GB-1147227, in which there is used an annular retaining piston which radially holds the nut segments and whose axial displacement, carried out through pressurised gas generated by explosive charges or even hydraulically, enables diverging the segments; GB-2373554, which provides for obtaining the diverging of the nut segments through the axial displacement of a containment sleeve formed with inner recesses which enable the radial opening movement of the segments, and the displacement of the containment spring is obtained hydraulically; U.S. Pat. No. 3,813,984, in which the diverging of the nut segments is obtained through the axial displacement of two bushings provided with internal recesses and driven hydraulically in opposite directions; U.S. Pat. No. 3,926,090, in which the diverging of the nut segments is also obtained through a plunger whose movement activates a kinetic energy dissipator to reduce the actuation mechanical shock; U.S. Pat. No. 5,245,738, in which the nut with segments is contained in a bushing also of the type provided with segments in turn enclosed in a spiral retaining wire whose loosening and whose ensuing expansion are driven by a flexible hollow transmission; U.S. Pat. No. 6,352,397, which provides for a rotor normally blocked in rotation and cooperating with a stator having an axial support inclined surface of an end of the nut segments, and an axial thruster which acts on the other ends of the segments causing the diverging thereof so as to free the rotor in rotation to free the screw; U.S. Pat. No. 6,525,920, in which the head of the connection screw is held by a body ("split spool") made up of two symmetric elements pressed against each other by a torsional spring, which is held by a metal wire which is broken due to the Joule effect to enable the opening of the spring and the separation of the two elements to free the screw.

These solutions are also generally affected by one or more of the drawbacks listed above, thus the use thereof is considerably limited.

SUMMARY OF THE INVENTION

The object of the present invention is to overcome the aforementioned drawbacks and such object is attained by a device as defined in the pre-characterising part of claim 1, whose peculiar feature lies in the fact that the actuator means comprise an element rotatably coaxial with respect to the blocking member, an articulated mechanism which operatively connects said rotatable element with said segments of the blocking member, and drive means for driving the controlled rotation of said rotatable element and, through said articulated mechanism, the simultaneous displacement of the segments of the blocking member between said retaining and release positions. The articulated mechanism comprises a plurality of connecting rod and crank units, each of which conveniently defines a knee connected to the rotatable element.

According to a first embodiment of the invention, the rotatable element is an elastic ring forcedly positioned between stationary retaining means and the drive means are linear motors, for example of the piezoelectric type, which act in radial direction on the elastic ring between the stationary retaining means to perform the sequential localised micro-deformations thereon.

The coupling between the elastic ring and the connecting rod and crank mechanisms imparts the coordinated and simultaneous rotation of the pins between the connecting rods and cranks around the hinges of the cranks, thus enabling the radial excursion thereof with respect to the axis of the device. This leads to the coordination and simultaneousness of the motion of the connecting rod and crank mechanisms, and thus of the nut segments, between the retaining position and the complete release position of the screw.

In variants of the invention the drive means consist of elements made of shape memory material, more in particular wires eccentrically connecting a rotatable member with a stationary member, operatively connected to a heating system for example by Joule effect so as to be subjected to a transformation from the martensite phase to the austenite phase of the shape memory material. The transformation produces a shortening of the wires which induces a rotation of the rotatable member relative to the stationary member and the congruous simultaneous actuation of the connecting rod and crank units, with the ensuing displacement of the segments of the blocking member from the retaining position to the release position.

The invention enables attaining considerable advantages, as listed below:
   release without generating mechanical shocks,
   high level of applicable pre-load,
   use of standard screws,
   release without generating materials,
   unlimited number of retaining and release actuations,
   no operation to reset or replace parts is required,
   ease of application of means for detecting the applied pre-load,
   exclusive use of patented actuation technology, based on use of piezoelectric linear micro-actuators or, alternatively, elements made of shape memory material.

BRIEF DESCRIPTION OF THE DRAWINGS

The invention will now be described in detail, purely by way of non-limiting example, with reference to the attached drawings, wherein:

FIGS. 15 and 16 are two cross-sectional views of a first embodiment of a component of the device according to the invention, respectively represented in the retaining configuration and in the release configuration of the device.

DETAILED DESCRIPTION OF THE INVENTION

Figure 1:
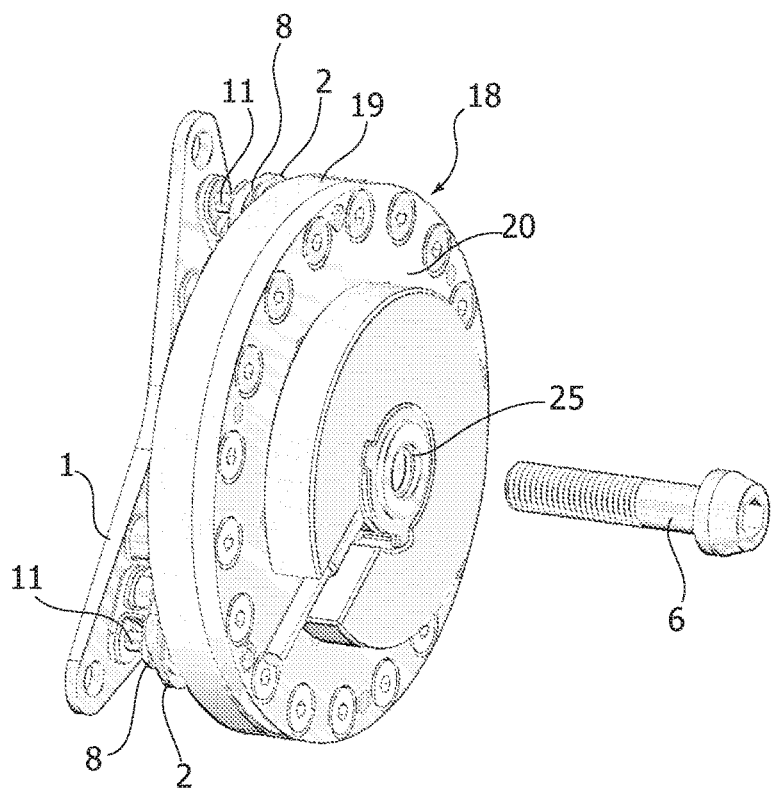
FIG. 1 is a schematic perspective view of a device according to the invention for the hold-down and controlled release of space satellites installed on launchers and loads installed on space satellites.
Figure 2:
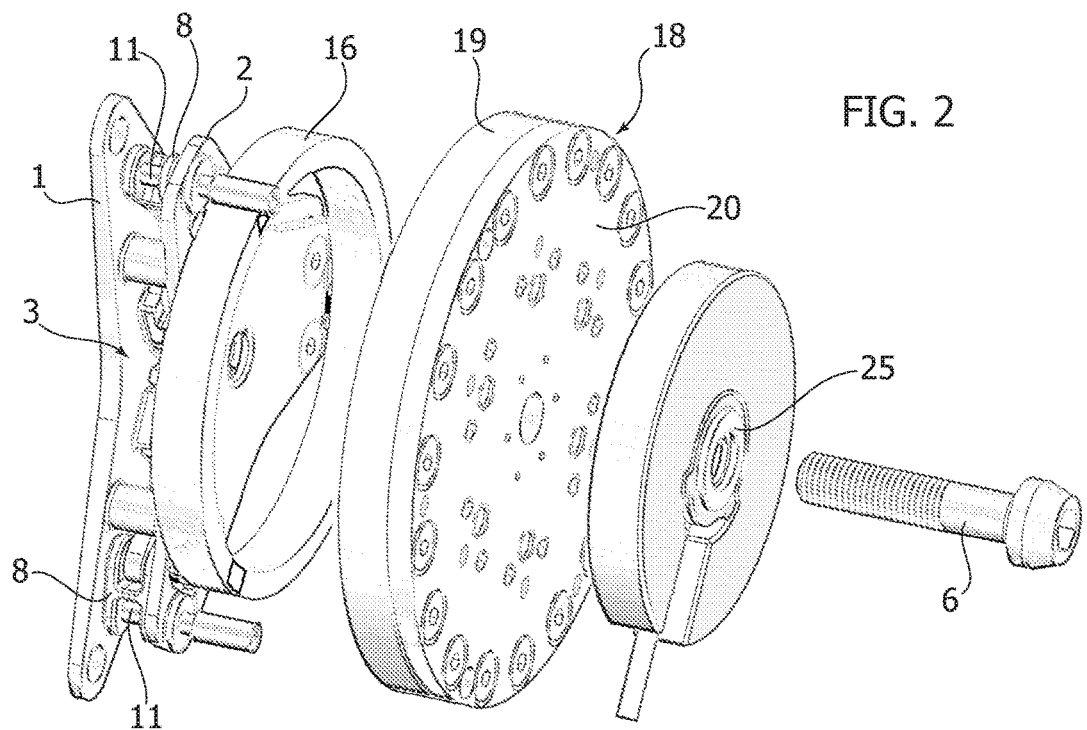
FIG. 2 is a partly exploded view of FIG. 1.
Figure 3:
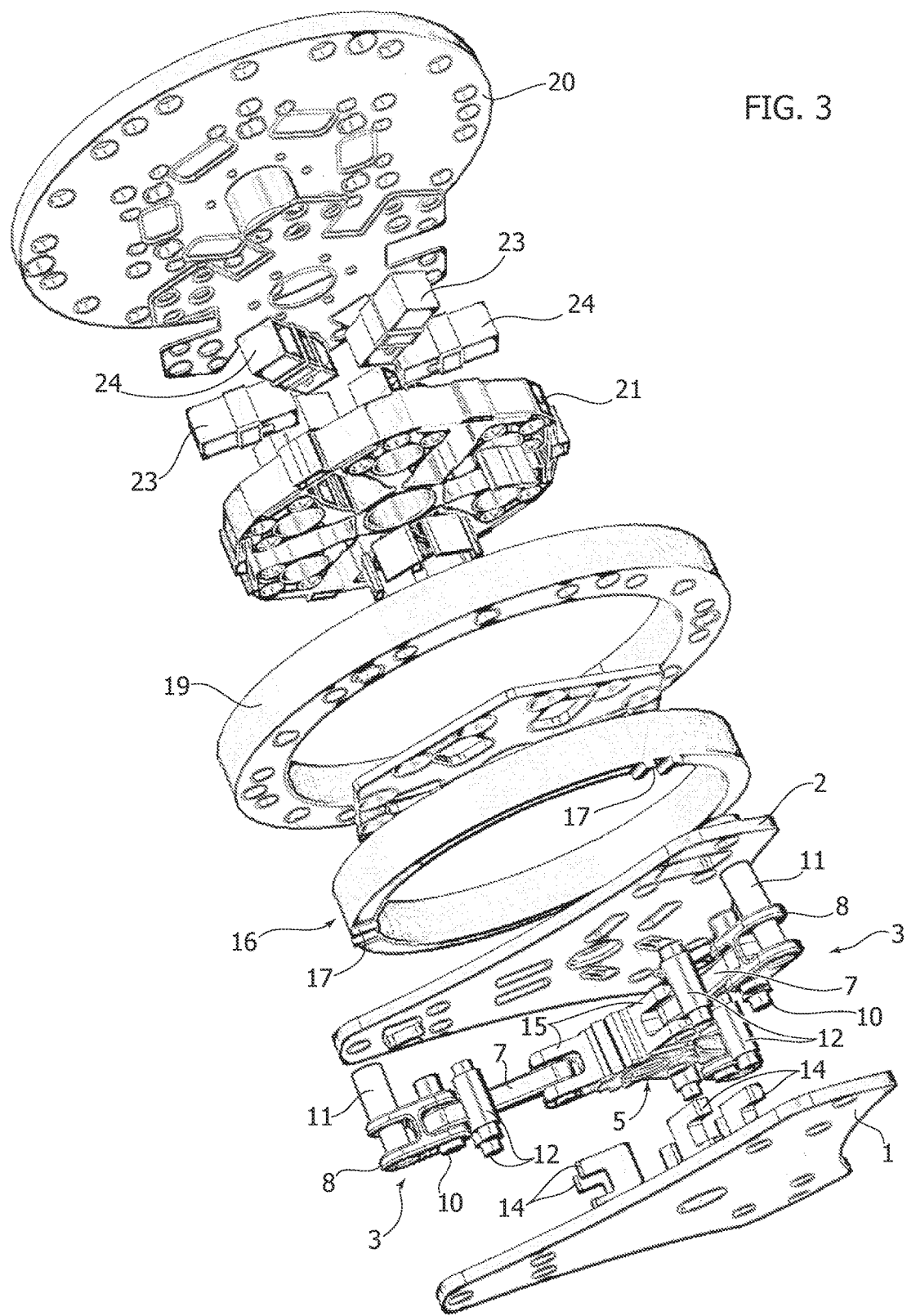
FIG. 3 is a bottom and further exploded perspective view of the device.

Initially with reference to FIGS. 1 and 2, the device according to the invention essentially comprises a body made up of a pair of juxtaposed plates respectively outer 1 and inner 2 between which there is arranged an articulated mechanism indicated in its entirety with 3 and provided to control the radial displacement of radially displaceable segments 4 of a blocking member constituted by a threaded nut 5 cooperating with a connecting screw 6. Typically, the outer plate 1 is designated to be fixed to a space satellite while the screw 6 will be fixed to a load that will be released by the satellite.

Figure 4:
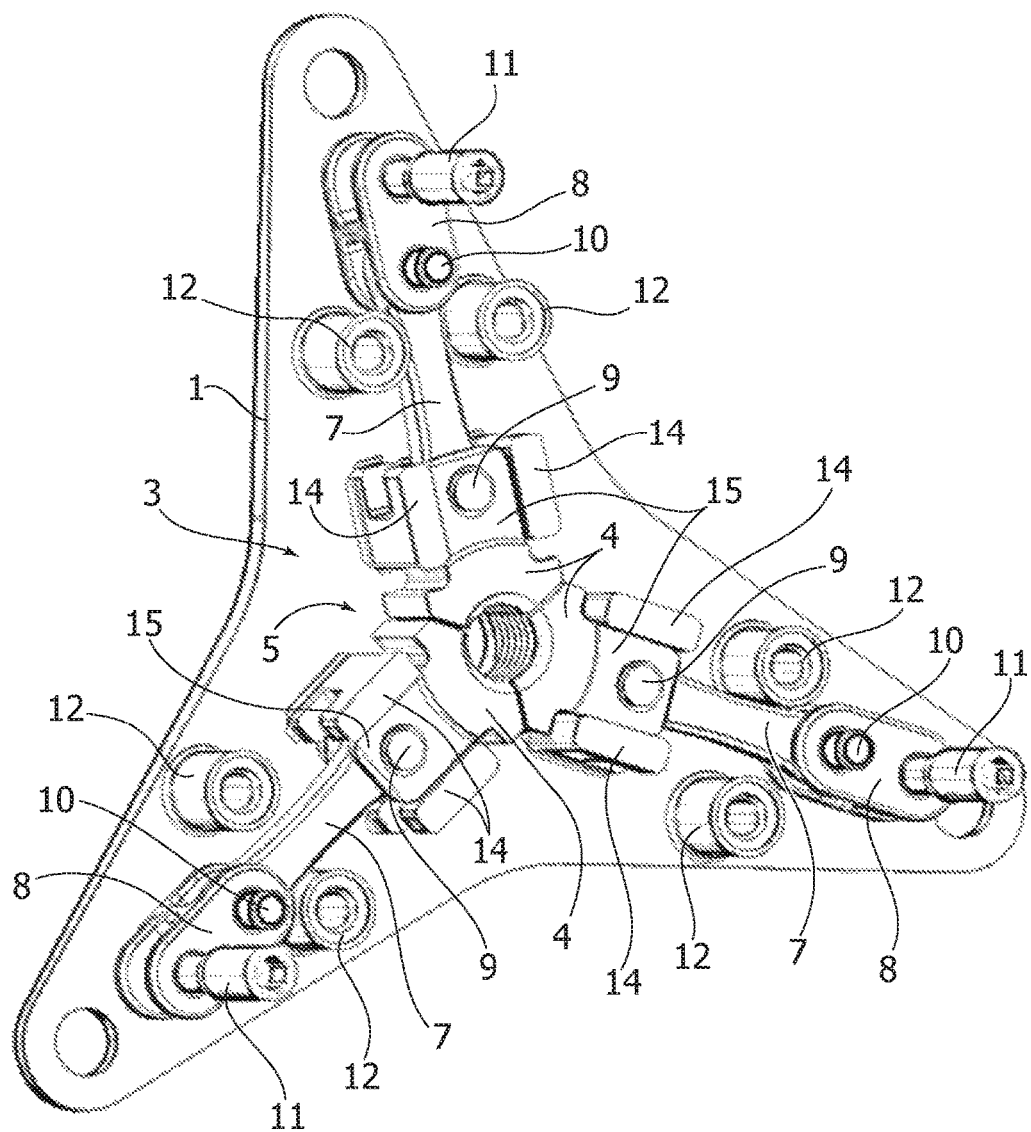
FIG. 4 is a perspective view and in larger scale of a detail of the device represented in the retaining configuration.
Figure 5:
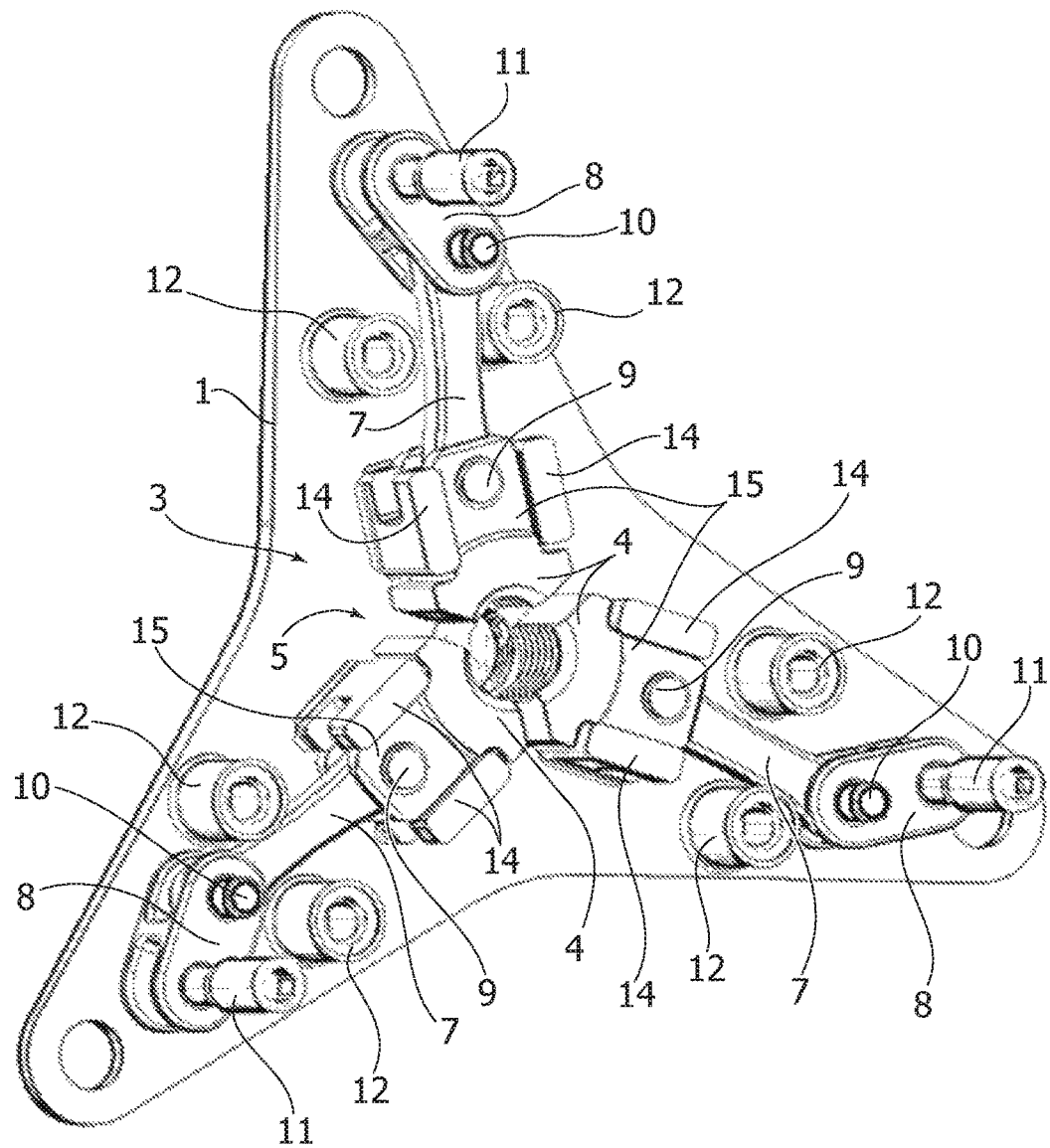
FIG. 5 is a view analogous to FIG. 4 showing the same detail in the release configuration.

As better observable in FIGS. 4 and 5 the articulated mechanism 3 comprises a triad of connecting rod 7 and crank 8 units in which each connecting rod 7 is articulated—on one side—to a respective segment 4 of the nut 5 by means of a pin 9, and—on the opposite side—to the crank 8 by means of a pin 10.

Each crank 8 is oscillatingly supported between the plates 1 and 2 by means of a respective pin 11, and the angular excursion thereof is limited by means of a pair of abutments 12 arranged on opposite sides with respect to the relative connecting rod 7.

The three connecting rod 7 and crank 8 units can be displaced in a coordinated and simultaneous fashion from the position represented in FIG. 4, corresponding to an approached condition of the segments 4 of the nut 5 in which the connecting rods 7 are substantially aligned with the respective cranks 8, and the configuration represented in FIG. 5 in which the cranks 7 form a knee with the respective cranks 8 and the segments 4 of the nut 5 are radially spaced from each other. The first configuration evidently corresponds to the engagement of the screw 6 in the nut 5, while the second corresponds to the release of the screw 6. The radial displacement of the segments 4 of the nut 5 between the mutually approached position and the mutually spaced position is guided by means of reliefs 14 projecting from the plate 1 and in which appendages 15 of such segments 4 carrying the pins 9 are slidable.

Figure 6:
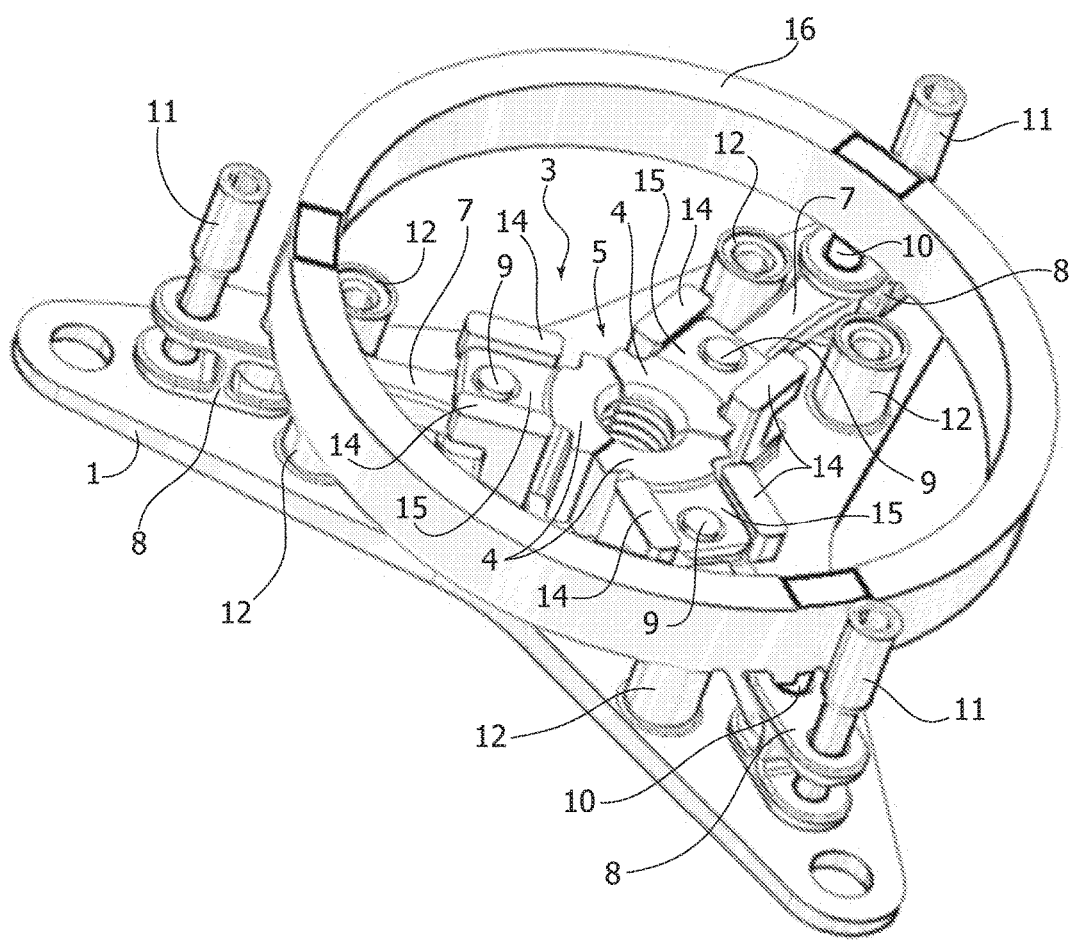
FIGS. 6 and 7 are two views analogous to FIGS. 4 and 5, respectively, with the addition of a further component of the device.
Figure 7:
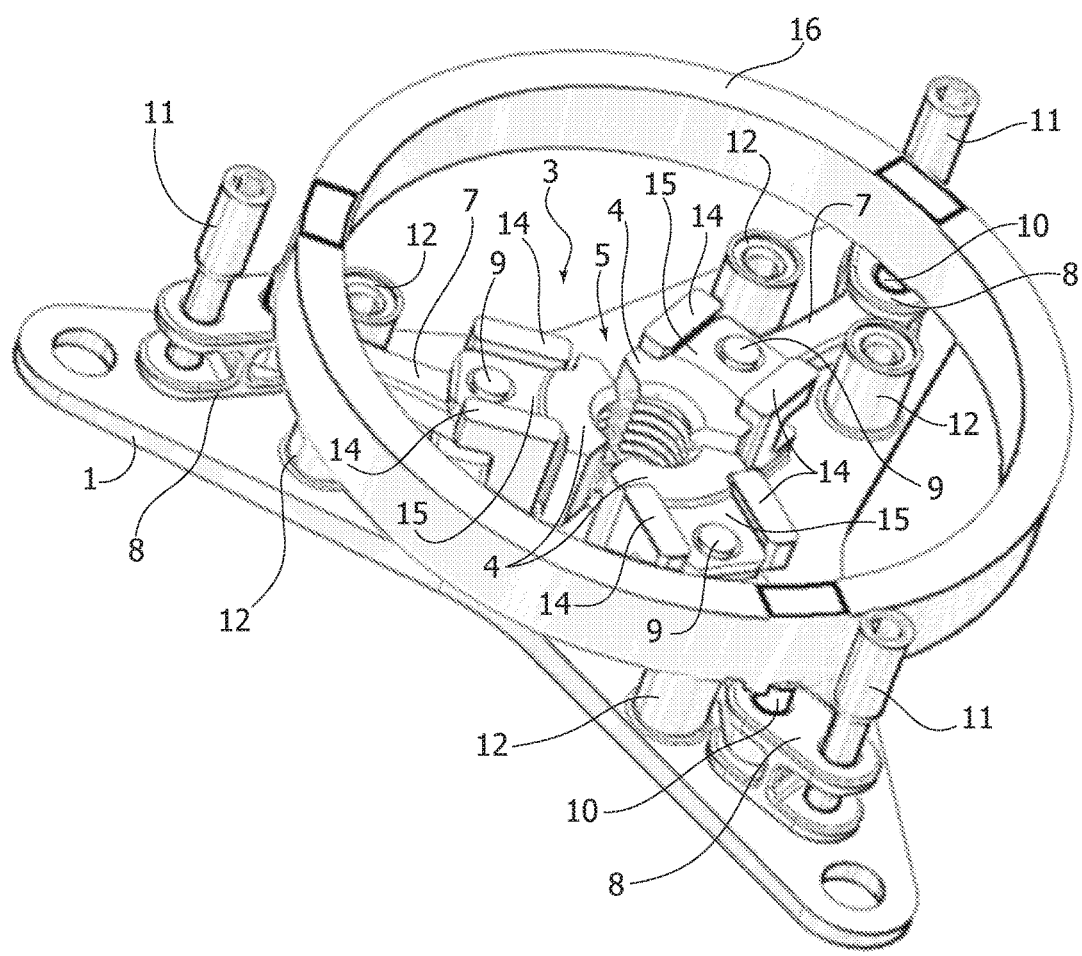

The actuation of the articulated mechanism 3 to obtain the displacement of the segments 4 of the nut 5 between the mutually approached positions and mutually spaced positions is obtained by means of a rotatable element, coaxial to the nut 5, constituted by an elastic ring 16 positioned outside the plate 2, on the side opposite to the plate 1. FIGS. 6 and 7 represent this ring 16 having the plate 2 fictitiously removed, for the sake of illustration simplicity.

Figure 8:
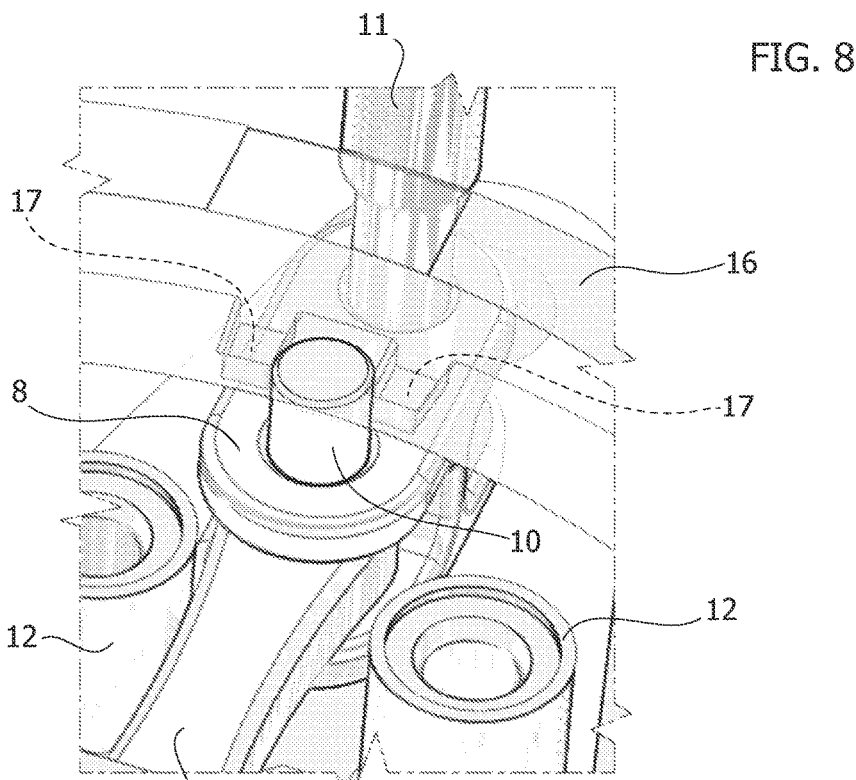
FIGS. 8 and 9 are two perspective views that are partial, schematic and in larger scale, showing a detail of FIGS. 6 and 7 respectively in the retaining configuration and in the release configuration of the device.
Figure 9:
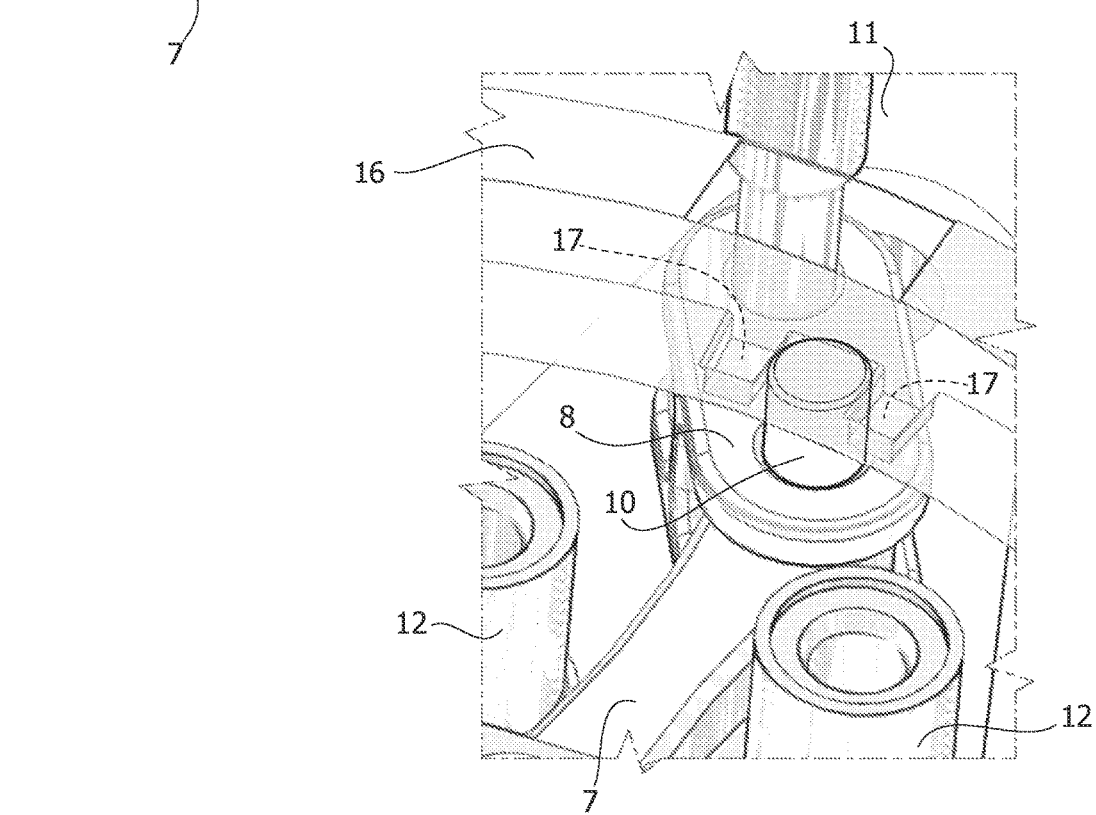
Figure 10:
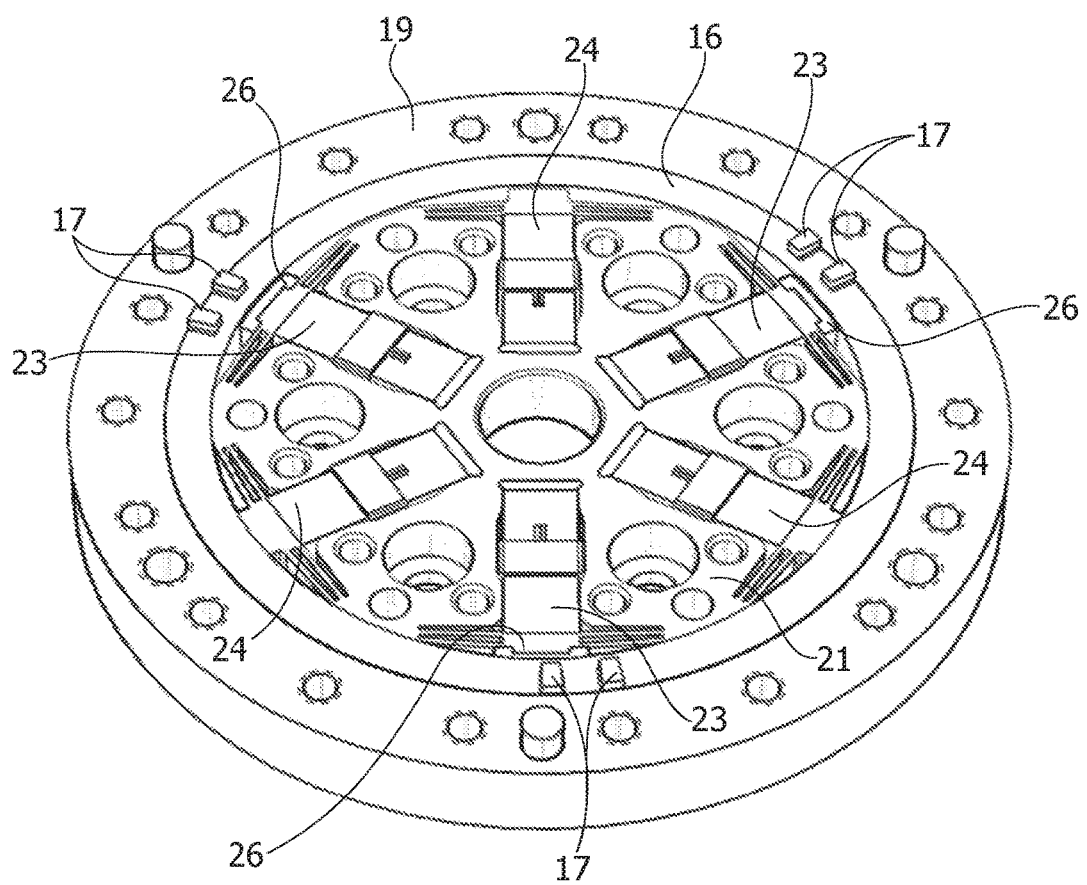
FIG. 10 is atop perspective view and in larger scale of a component illustrated in FIG. 3, FIGS. 11, 12, 13 and 14 are diagrams—in plan view—exemplifying the operation of the device according to the invention when passing from the retaining configuration to the release configuration.
Figure 11:
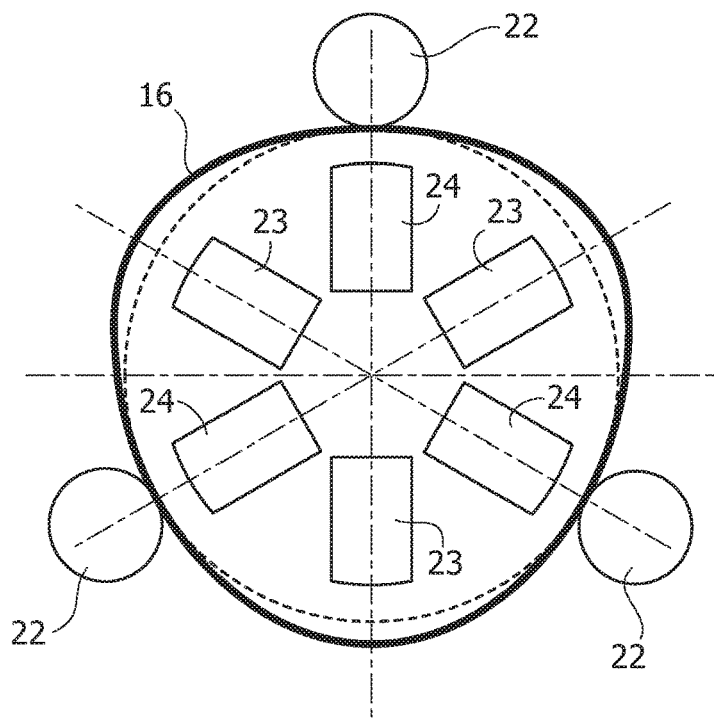

The ring 16 is formed at the surface thereof faced towards the plate 2 with a triad of pairs guide reliefs 17, better observable in FIGS. 8 and 9, in each of which there is freely inserted the pin 10 of a respective crank 8, passing through a corresponding opening of the plate 2.

The ring 16 is housed inside a casing 18 formed by an annular element 19 to which there are fixed the free ends of the pins 11, also projecting through the plate 2, and a cover 20.

The ring 16 is forcedly inserted into the annular element 19, whose inner surface is given by the intersection of six arcs, centred on an equal number of different positions, which determine six lobes of two distinct forms: a thrust form and a block form, alternating with respect to each other. The lobes with block form, with respect to which the ring 16 is positioned forcedly but rotatably for a limited angular width, are schematised as locking pins 22 in FIGS. 11-14, to be addressed hereinafter.

Inside the ring 16 there is arranged a body 21 formed with a radial of seats bearing a first triad of linear motors 23, radially positioned between each pair of lobes or locking pins 22, and a second triad of linear motors 24 alternated with the linear motors 23 and radially positioned angularly with respect to the lobes or locking pins 22.

The linear motors 23 and 24 are conveniently micro-actuators of piezoelectric type, and they will be hereinafter respectively referred to as thrust piezoelectric actuators 23 and block piezoelectric actuators 24.

Between the block piezoelectric actuators 24 and the ring 16 there are conveniently interposed inserts 26 whose surface is treated so as to maximise the coefficient of friction.

The assembly constituted by the elastic ring 16, by the locking pins 22 and the thrust 23 and block 24 piezoelectric actuators constitutes a motor with linear actuators substantially of the type described and illustrated in document WO-2014/013442A1 granted to PHI DRIVE S.r.l. and whose technology is exclusively licensed to the Applicant of the present patent for the application subject of the present invention.

However, it should be observed that the actuation system of the segments 4 of the nut 5 by means of the articulated mechanism 3 could differ from the one described and illustrated herein by way of non-limiting example, and for example consist in the mechanism according to document WO-2014/013443 also granted to PHI DRIVE S.r.l., or any functionally equivalent mechanism as long as suitable to control the motion of the segments 4 of the nut 5 through interconnected articulations. In addition, the thrust piezoelectric actuator 23 and the block piezoelectric actuator 24 may be replaced by linear micro-actuators of different type, as long as capable of operating as described hereinafter.

The screw 6 coaxially traverses the casing 18, the elastic ring 16, the body 21 and the plate 2 to be screwed into the nut 5 in the radially approached condition of the segments 4 thereof.

Given that the device according to the invention is normally provided for multiple use with identical devices, a pre-load sensor 21 is also optionally applied outside the casing 18 with the aim of verifying the homogeneity with which different devices are pre-loaded, so as to guarantee the simultaneous release thereof. Such pre-load device is of the generally known type, for example with load cells, and thus will not be described in detail herein for the sake of conciseness.

The device according to the invention operates as follows.

The radial movement of the segments 4 of the nut 5 is operated through connecting rod 7 and crank 8 articulations interconnected to each other through the elastic ring 16. Such ring 16 intercepts, through the guide reliefs 17, the corresponding pins 10 of the knee between each connecting rod 7 and the relative crank 8: this coupling imparts the coordinated and simultaneous rotation of the pins 10 around the pins 11, without preventing the radial excursion of the connecting rods 7 with respect to the axis of the nut 5. Such angular excursion, limited by the abutments 12, is of a few degrees and this leads to a corresponding radial translation of the appendages 15 of the segments 4 of the nut 5 between the mutually approached position thereof, represented in the FIGS. 4 and 6 and corresponding to the retaining of the screw 6, and the radially spaced position represented in FIGS. 5 and 7 and corresponding to the release of the screw 6.

The rotation of the elastic ring 16 that generates the radial movement to open and close the segments 4 of the nut 5 is carried out, with reference to the diagrams of FIGS. 11 to 14, as follows.

The operating principle, described in detail in the previously mentioned document WO-2014/013442A1, is based on the sequential and controlled application of micro-deformations to the elastic ring 16, statically forced between the lobes of the annular element 19 schematised by the locking pin 22. Due to such aforementioned forced positioning and the lobe-like configuration of the annular element 19, the elastic ring 16 is deformed generating three lobes, as schematised in FIG. 11. At the apex of each lobe there corresponds a respective thrust piezoelectric actuator 23.

Figure 12:
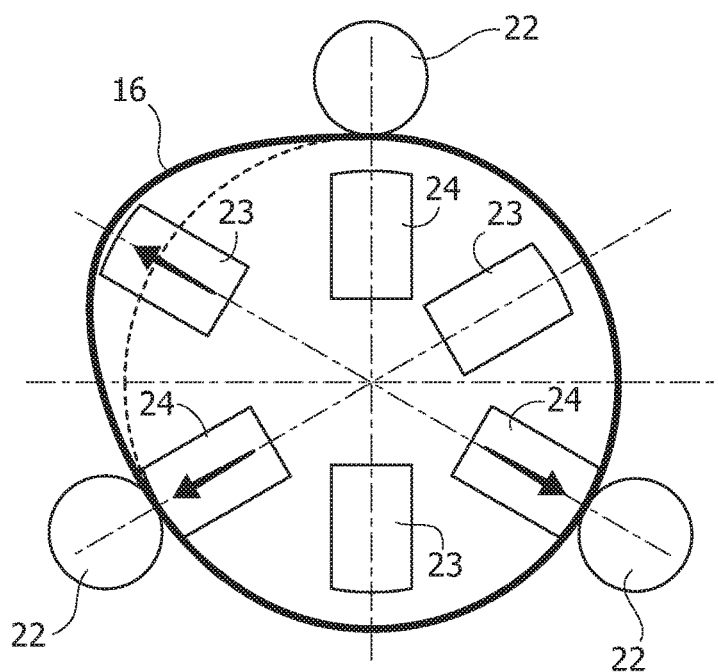
Figure 13:
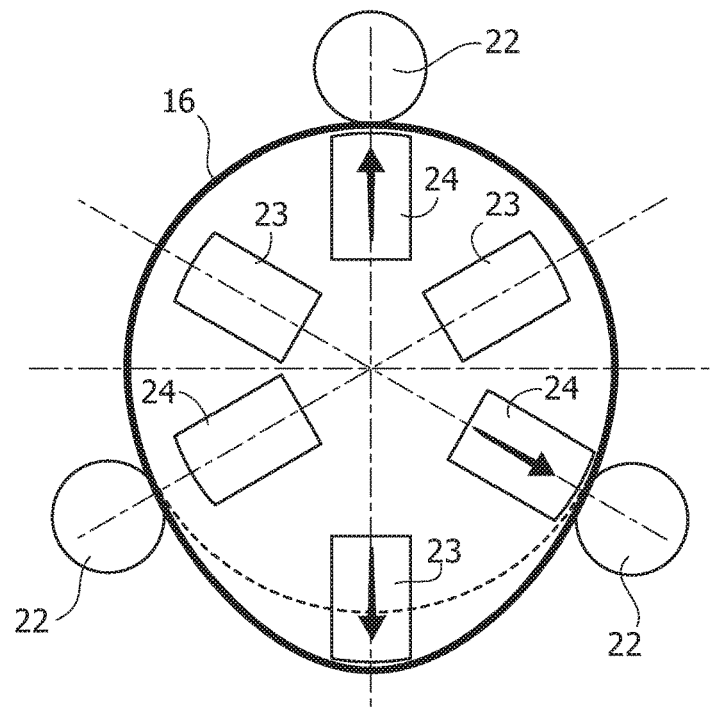
Figure 14:
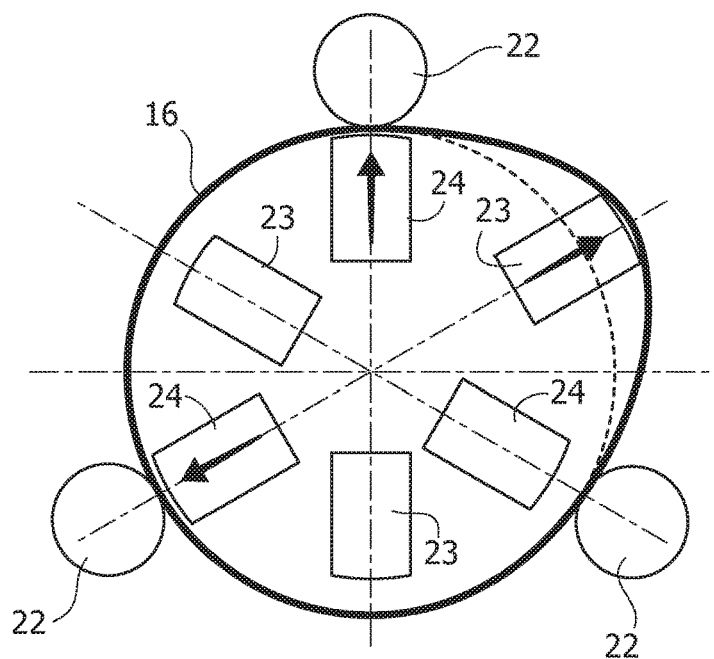

Radially pressing one of these lobes, by actuating one of the thrust piezoelectric actuators 23 as represented in FIG. 12, such lobe is accentuated and the corresponding locally deformed portion is transferred, reducing at least one of the other two lobes, through a micro-sliding of the ring 16 at one of the locking pins 22 adjacent to the lobe in question, whose corresponding block piezoelectric actuator 24 remains inactive. Simultaneously, block piezoelectric actuators 24 juxtaposed with respect to the other two locking pins 22 locally block the elastic ring 16, preventing the micro-sliding thereof. Selectively synchronously providing the thrust piezoelectric actuators 23 and the block piezoelectric actuators 24 with a suitable sequence and frequency, through a suitable electronic control system, enables obtaining the rotation of the ring for example as represented in FIGS. 13 and 14 in which, like in FIG. 12, the arrows indicate the operating state of the piezoelectric actuators 23 and 24.

To each rotation (in one direction or in the opposite direction) of the elastic ring 16 there corresponds an angular displacement of the pins 10 of the connecting rod 7 and crank 8 units, and thus a corresponding linear displacement of the segments 4 of the nut 5.

The actuation of the segments 4 by means of the articulations synchronously driven by a rotary actuator constitutes the uniqueness of the device according to the invention, due to which it is possible to open the nut 5 to release the pin 6 through a perfectly synchronous movement of the segments 4 thereof. The device is perfectly reversible, in that the nut 5 can be opened and closed by inverting the angular motion of the elastic ring 16, and it can thus be used for an unlimited number of actuations without requiring particular reset operations.

A further advantage of device according to the invention lies in the fact that it operates in open loop without requiring encoders or other positional control devices.

The motion of the segments 4 of the nut 5 occurs at a low speed, in a coordinated and repeatable fashion. Repeatability guarantees open simultaneousness, while the slowness of the motion enables nullifying the axial pre-load of the screw 6 before the separation thereof from the nut 5, thus preventing the generation of mechanical shocks due to an instantaneous freeing of the pre-load energy.

By way of example, it should be observed that an M8 screw with a 50 mm non-threaded section extends by about 0.15 mm when stressed with a 30 kN pre-load. This extension is completely recovered by a radial motion of the segments 4 of the nut 5 equivalent to about 0.3 mm. The complete disengagement between segments 4 and the screw 6 occurs with an about 1 mm radial motion. With a rotational speed set at around 0.1 rpm, the pre-load is nullified after about 5 s and the complete disengagement after about 7 s.

The use of piezoelectric micro-actuators, which—as mentioned—is not strictly necessary, attains the further advantage of guaranteeing high block torques in absence of power and generating a high repeatability of the imparted motion. Such repeatability characteristics enable the multiple use of devices according to the invention, that can be actuated simultaneously.

Lastly, the ability of the piezoelectric micro-actuators to develop high torques at low rotational speed guarantees great precision and repeatability, absence of clearances both when starting and inverting motion, high block torque also obtainable in the absence of power, low electric energy consumption, small overall dimension, not particularly strict construction tolerances, absence of lubrication, construction simplicity, high reliability and low costs.

Obviously, the construction details and the embodiments may widely vary with respect to what has been described and illustrated, without departing from the scope of protection of the invention as described in the claims that follow. Thus, the block linear actuators could be removed and the thrust linear actuators could also act from outside the elastic ring 16, instead of from inside, as exemplified in the previously mentioned document WO-2014/013442A1.

In the embodiment described up to now, and as illustrated in detail in FIGS. 15 and 16, the screw 6 directly cooperates with the segments 4 of the nut 5, which—as mentioned—are internally threaded like the screw 6. FIG. 15 shows the retaining configuration, in which the segments 4 are mutually radially approached engaging the thread of the screw 6, while FIG. 16 represents the radially spaced apart configuration of the segments 4 for the release of the screw 6.

Figure 17:
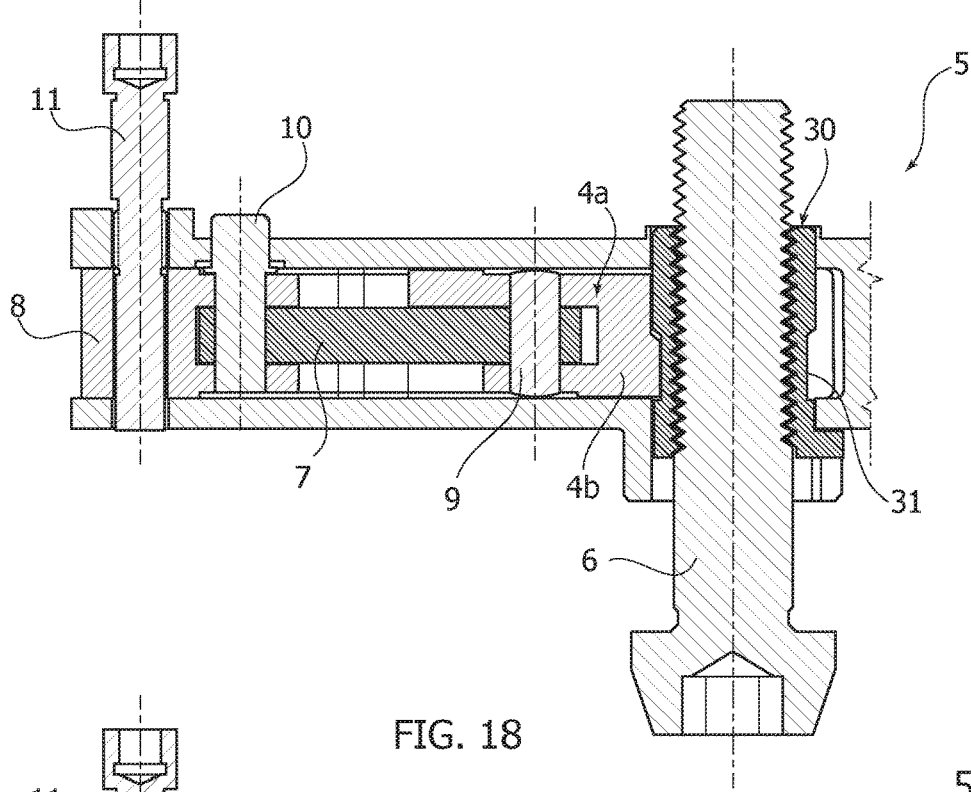
FIGS. 17 and 18 are two views analogous to FIGS. 15 and 16, showing a variant.
Figure 18:
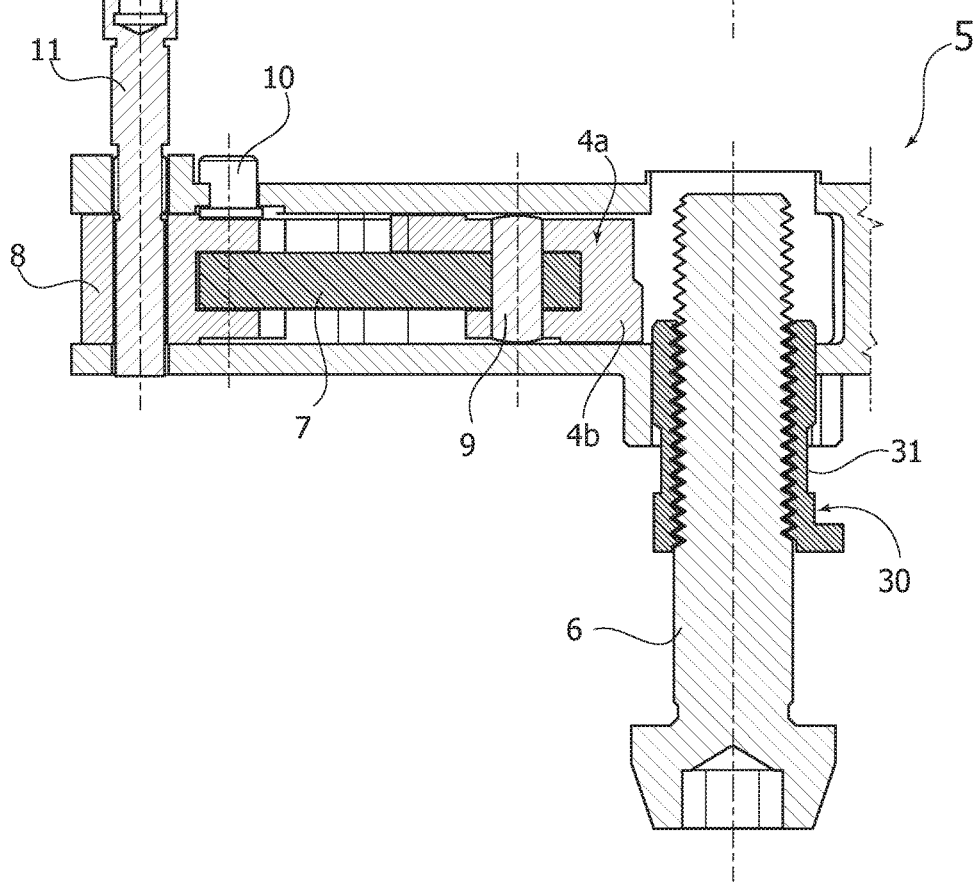

FIGS. 17 and 18 show a variant, currently deemed the preferred one in that advantageous for improving the mobility of the device when passing from the retaining configuration to the release configuration of the screw 6. In such variant, there is provided an internally threaded bushing 30 permanently fastened on the screw 6 and formed with a radial engagement outer portion, for example constituted by an annular groove 31. In this case, the blocking member 5 is formed by a triad of segments 4a provided with respective radial reliefs or teeth 4b suitable to engage the radial engagement portion 31 of the bushing 30, in the retaining configuration of the device represented in FIGS. 17 and 19. FIGS. 18 and 20 show the release configuration in which the segments 4a are radially spaced apart so as to disengage the bushing 30 and thus free the screw 6.

Figure 21:
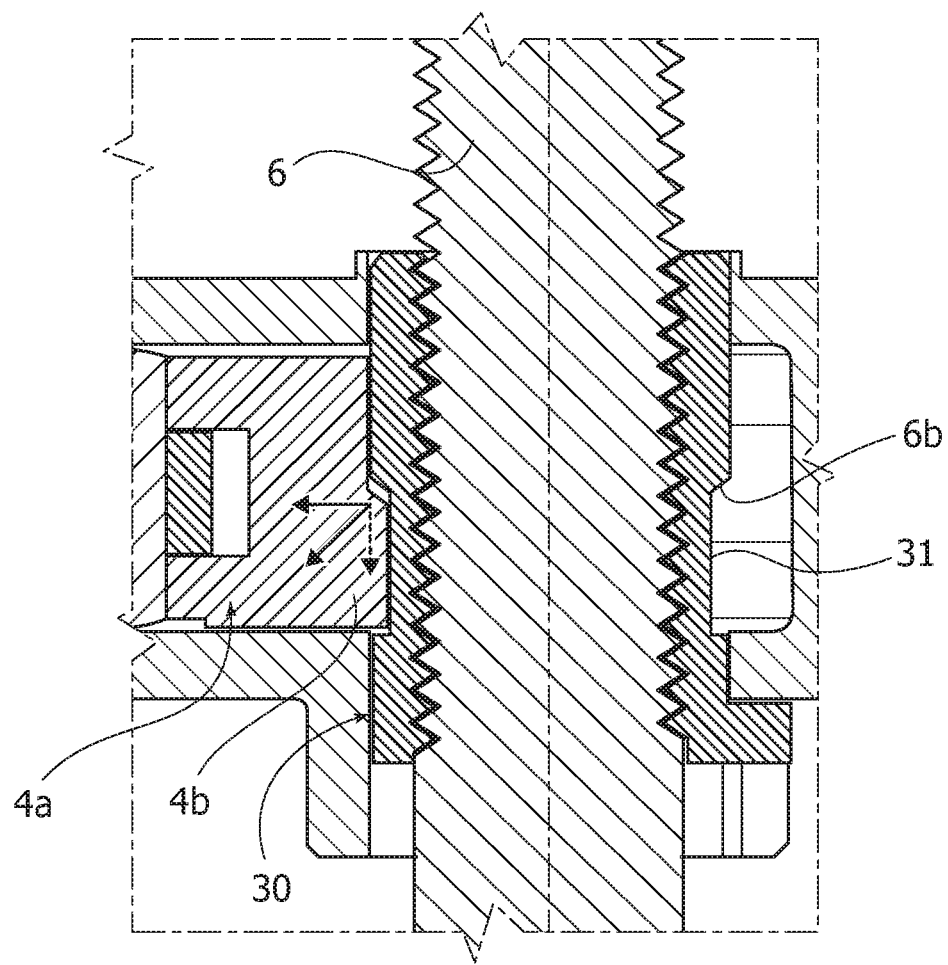
FIG. 21 shows an enlarged scale of the detail of FIG. 17, FIGS. 22 and 23 are two dorsal perspective views of a first variant of the device according to the invention, respectively represented in the retaining configuration and in the release configuration of the device.
Figure 22:
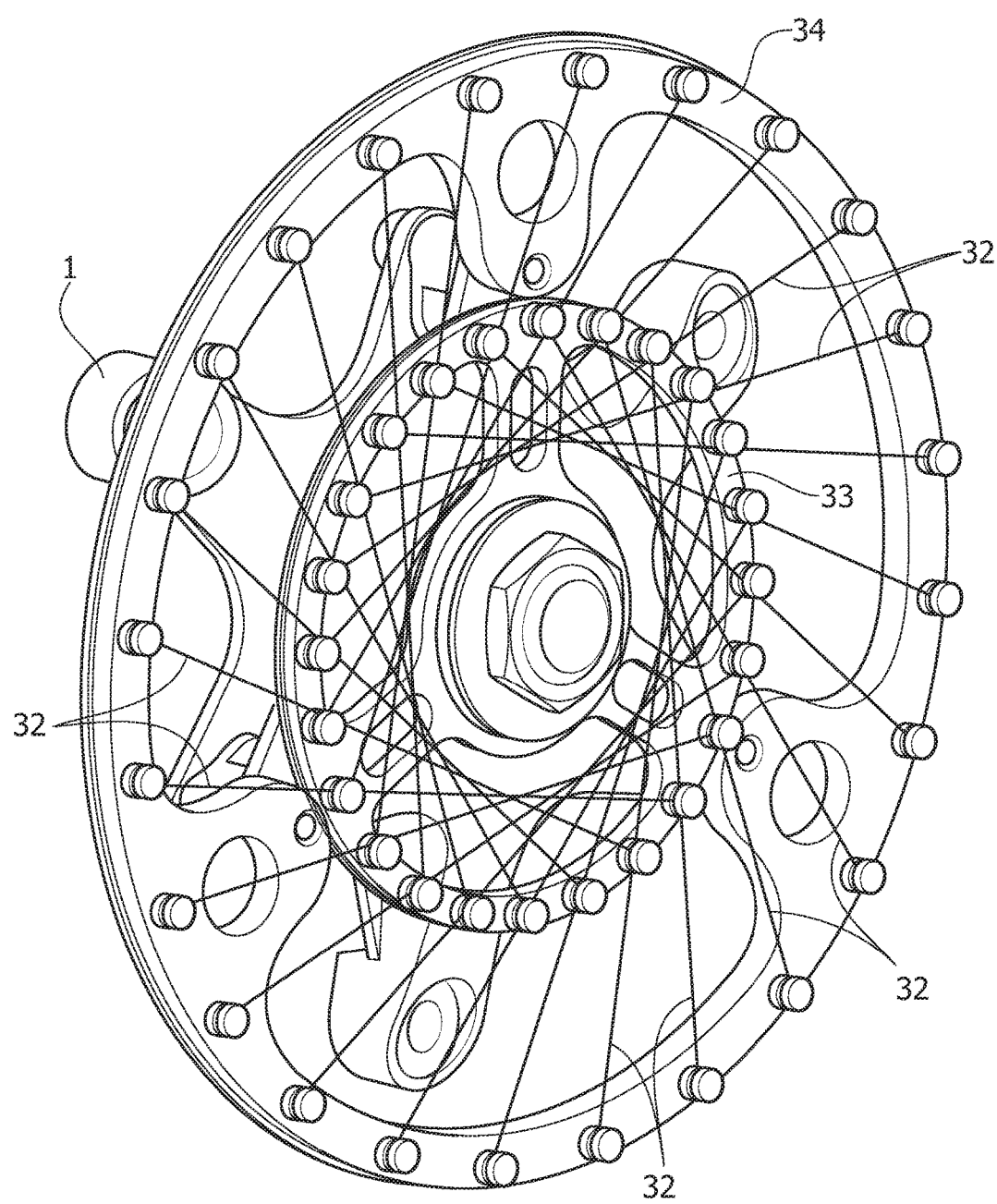
Figure 23:
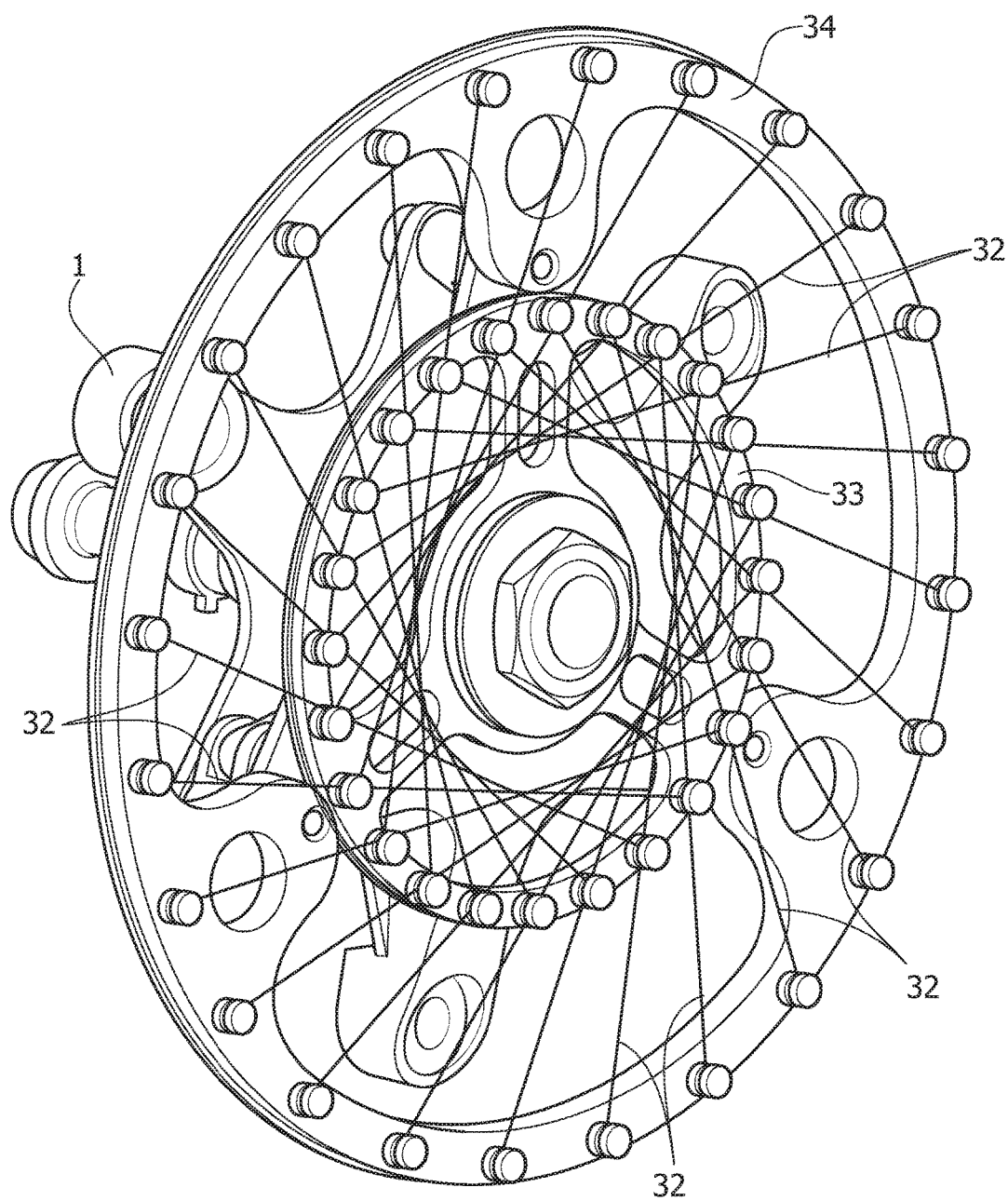
Figure 24:
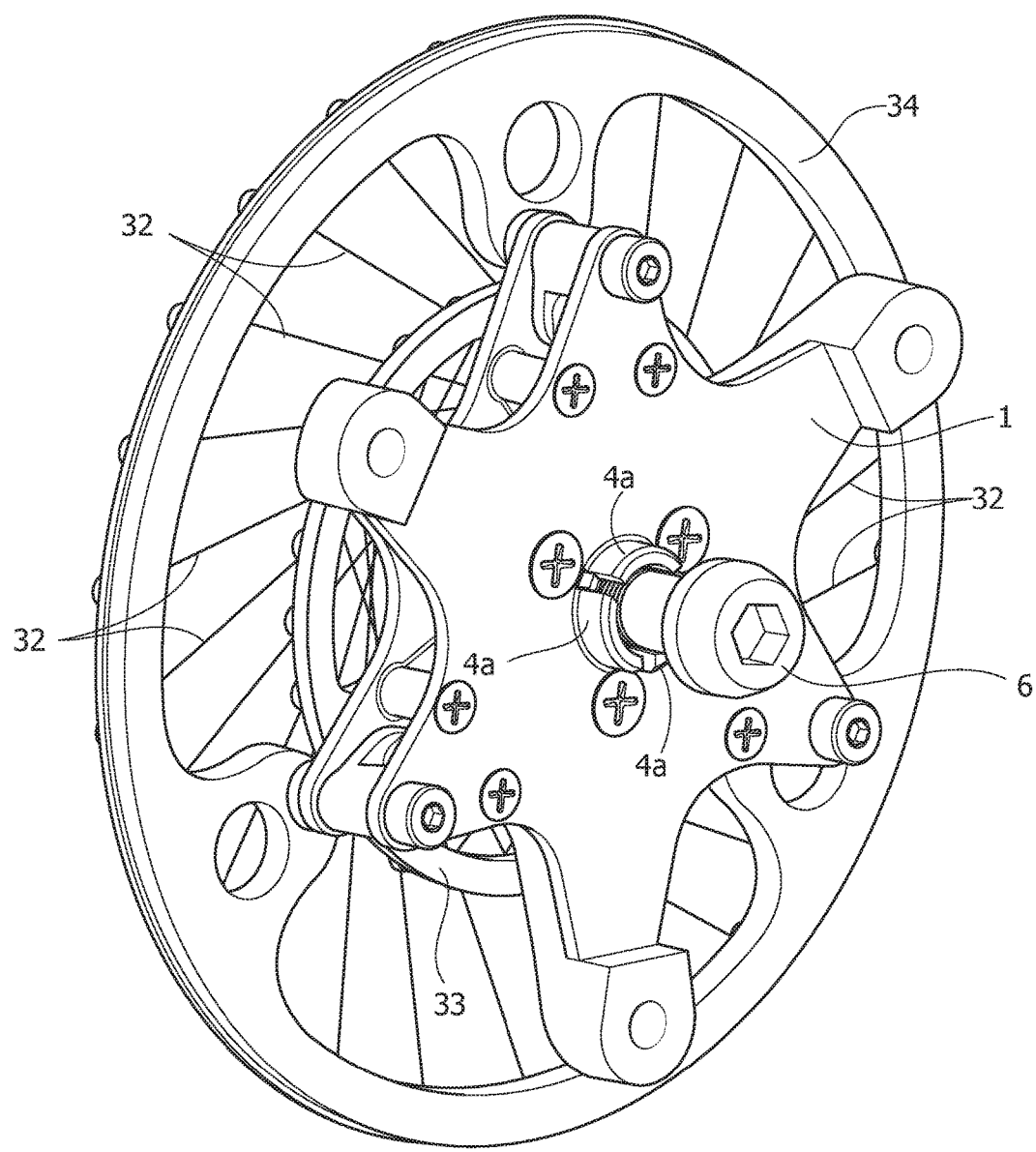
FIGS. 24 and 25 are two front views respectively of FIG. 22 and FIG. 23, FIGS. 26 and 27 are two dorsal perspective views of a second variant of the device according to the invention, respectively represented in the retaining configuration and in the release configuration of the device.
Figure 25:
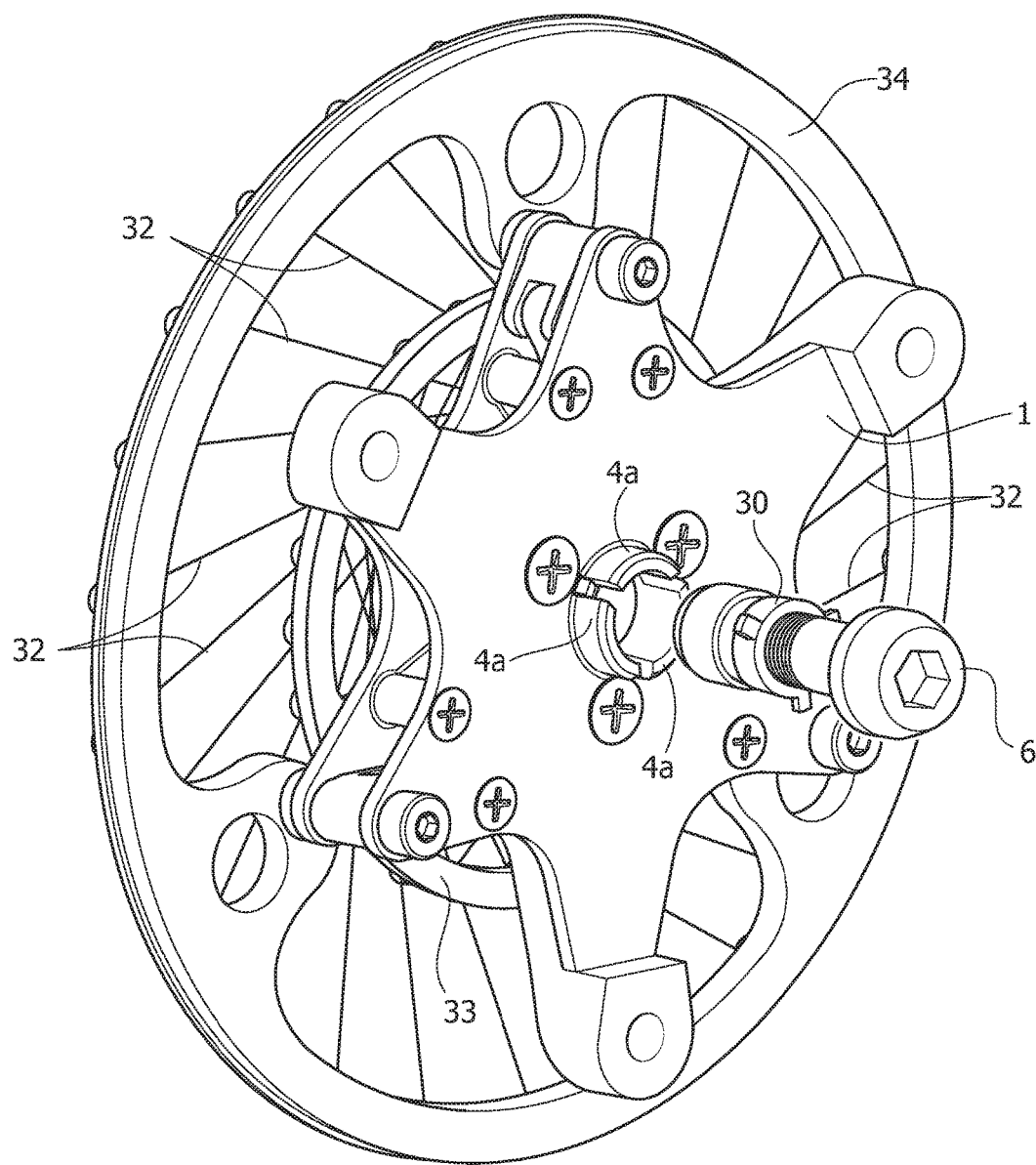

This arrangement is advantageous in that the constraint threading of the screw 6 is no longer interrupted and discontinuous. Furthermore, the bushing 30 may be formed with radial teeth or discontinuities 6a which, being engaged with hindrance parts of the structure of the device, react to the fastening torque applied by the segments 4a thus hindering the rotation of the screw 6. During the release step, the bushing 30 may be precisely guided by the structure of the device, and—in addition—the axial load applied in the bushing 30 by the screw 6 may be transferred to the segments 4a even through an inclined plane 6b, thus being axially and radially disassembled as schematised in FIG. 21. The axial position of such inclined plane and the inclination thereof may be selected so as to minimise the radial loads acting on the articulation pins 9, 10 of the connecting rod and crank elements 7, 8, so as to further reduce the mobility required to pass from the retaining configuration to the release configuration. For example, it was ascertained that a 15° angle and a 0.13 coefficient of friction generate a substantially null radial load on the pins 9, 10.

Figure 19:
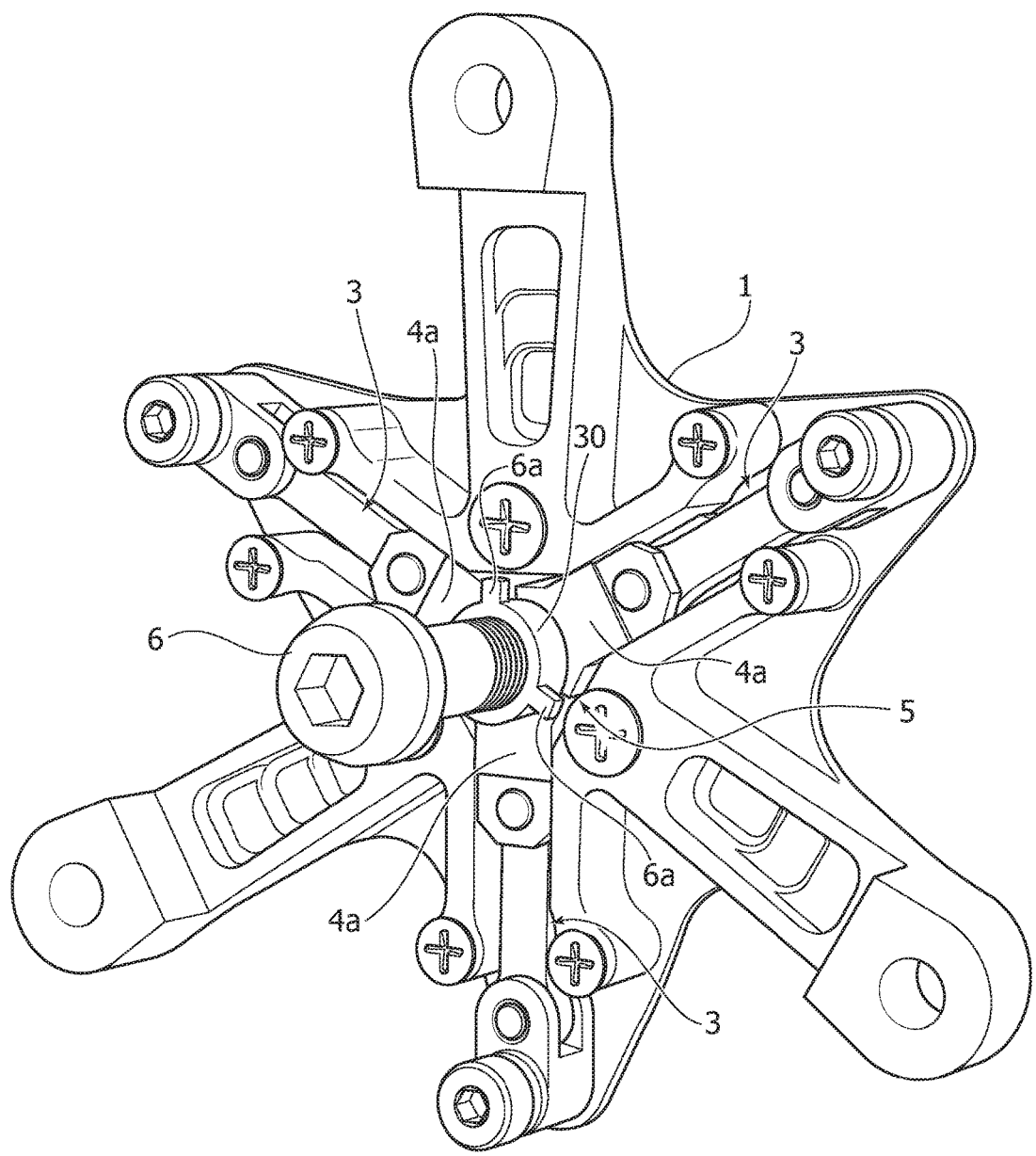
FIGS. 19 and 20 are two simplified perspective views showing the device according to the invention equipped with the component of FIGS. 17 and 18, respectively represented in the retaining configuration and in the release configuration of the device.
Figure 20:
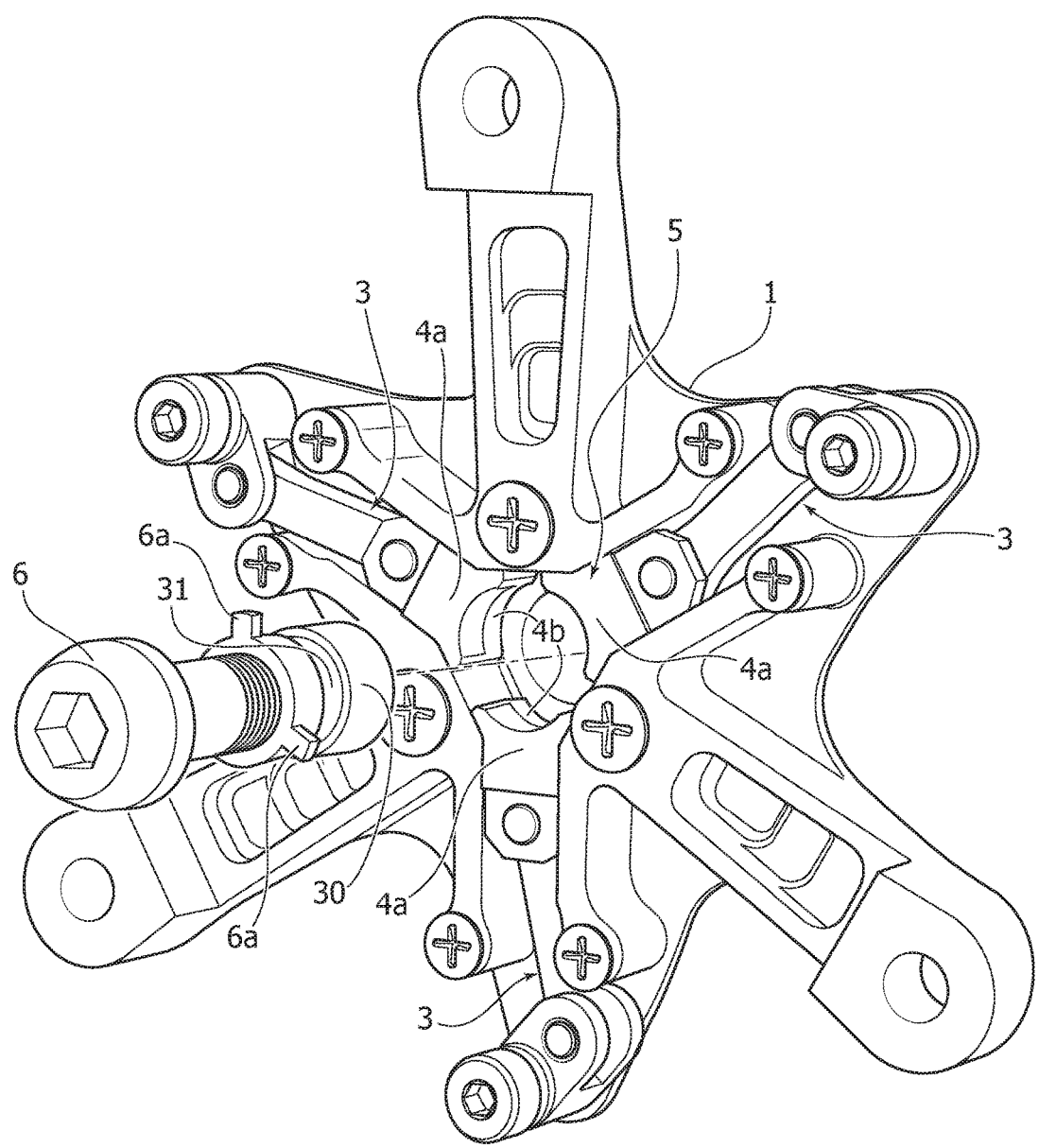

The general configuration of the device, represented in FIGS. 19 and 20 respectively in the retaining configuration and in the release configuration of the screw 6, does not differ from what has been described above neither conceptually nor functionally.

As previously mentioned, the actuator for actuating the articulated mechanism 3 formed by the connecting rods 7 and cranks 8 may be constituted by a different motor suitable to generate the torque required for an angular travel of a few degrees, suitable to perform the corresponding radial travel of the mobile segments 4 or 4a of the blocking member 5. The two variants represented in FIGS. 22-25 and 26-29 show two alternative examples in which the motor consists in elements made of shape memory material.

More in particular, the elements made of shape memory material consist in wires 32 for example made of NiTiNOL, each one of which may be extended, while in martensite phase, by a given percentage of the initial length thereof, and installed in such condition. Thus, upon heating the wires 32 typically due to the Joule effect by flowing an electrical current through them, the wires 32 will be subjected to a transformation in austenite phase during which they will recover the initial length.

In the embodiment illustrated in FIGS. 22-23 and 24-25 the wires 32 are distributed uniformly and obliquely connect the body of the device, constituted in this case by a radially outer stationary ring 34, with a radially inner rotatable ring 33 which simultaneously actuates the connecting rod and crank units 7, 8, like in the previously described embodiment. When the wires 32 are in martensite phase (FIGS. 22 and 24) the segments 4 or 4a are closed and the screw 6 is held, while when the wires 32 are subjected to transformation in austenite phase (FIGS. 23 and 25) the rotatable ring 33 is rotated relative to the stationary ring 34 so as to simultaneously actuate the rod and crank units 7, 8 whereby the segments 4 or 4a are spaced apart thus freeing the screw 6.

Figure 26:
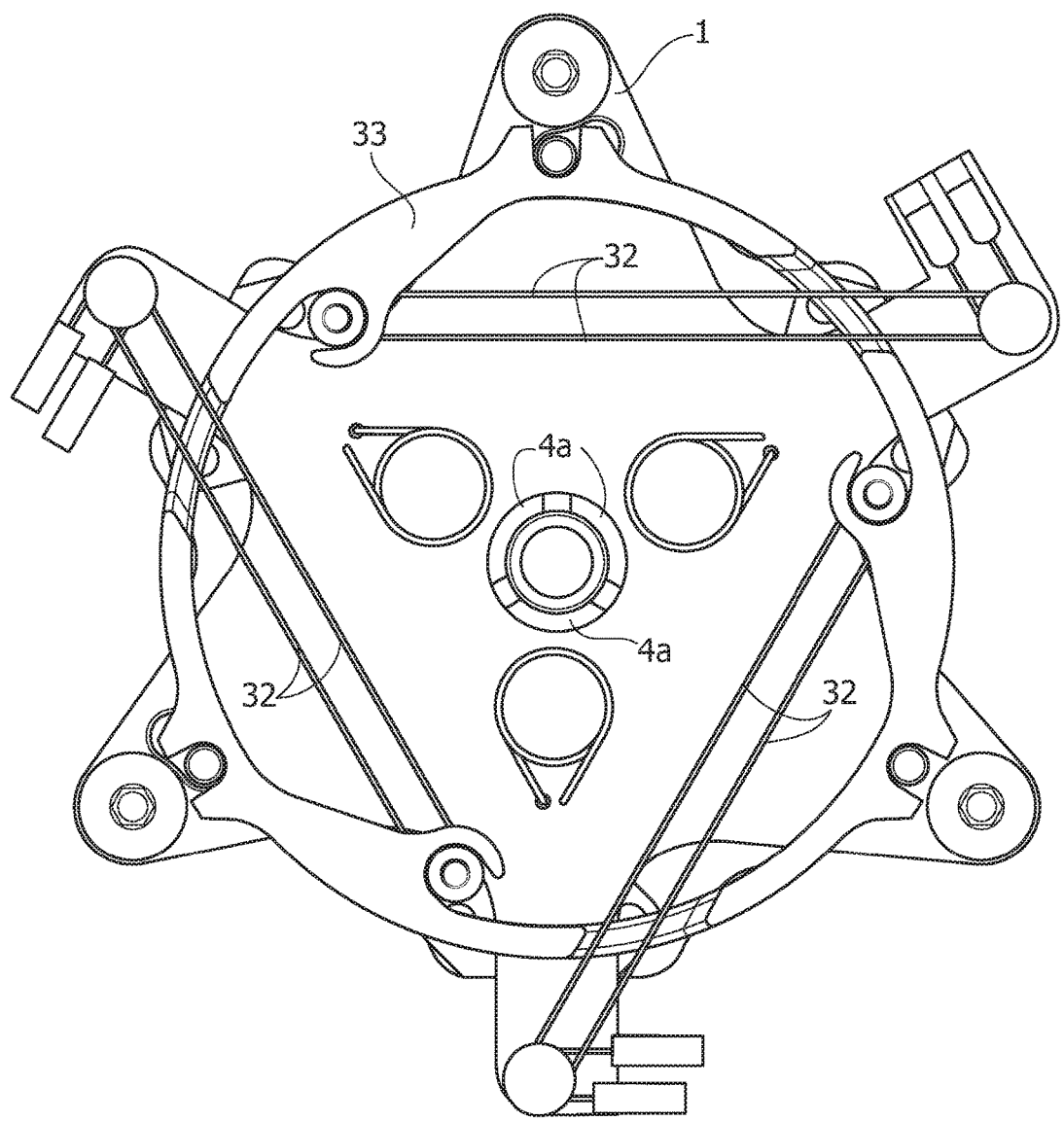
Figure 27:
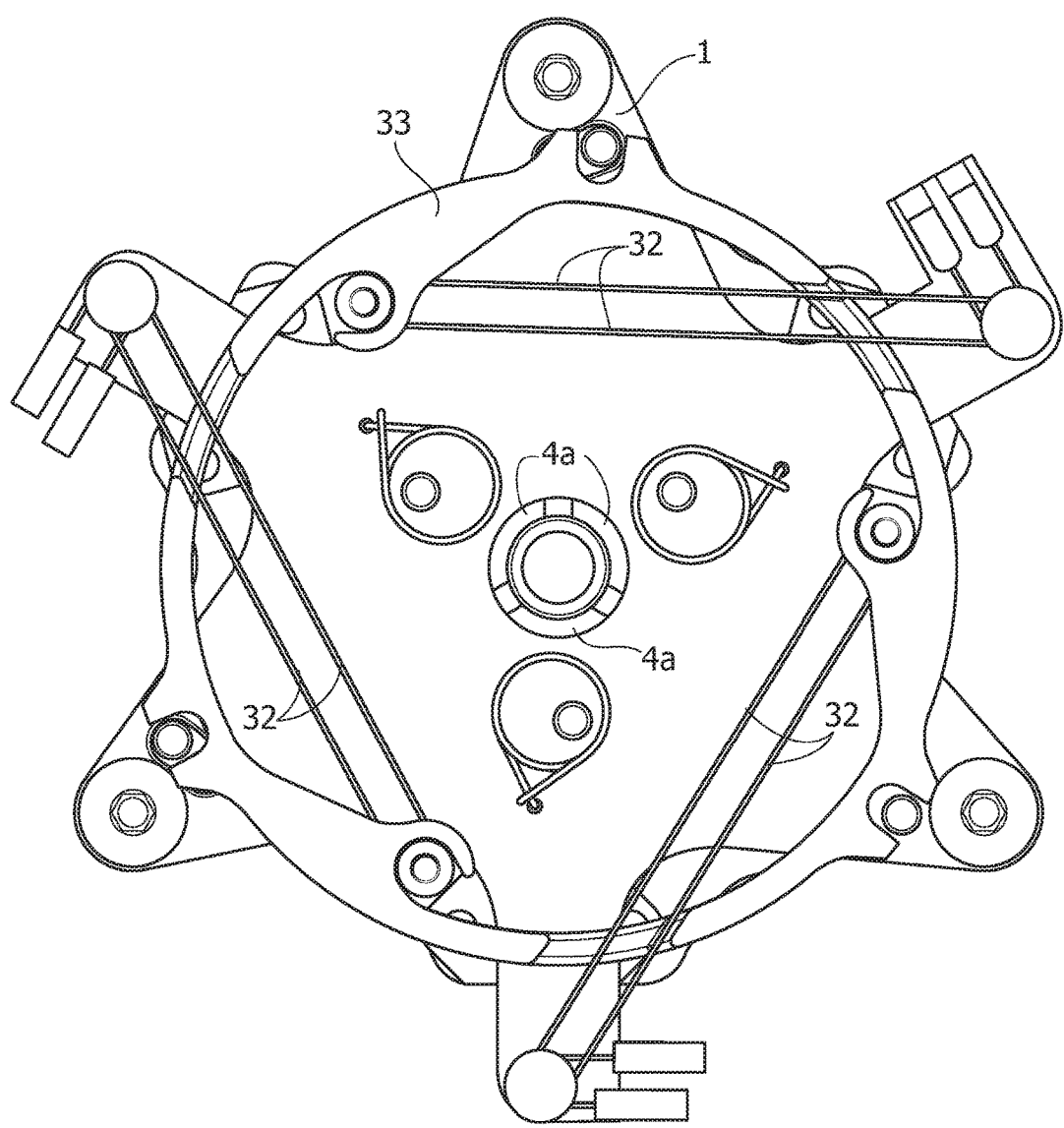
Figure 28:
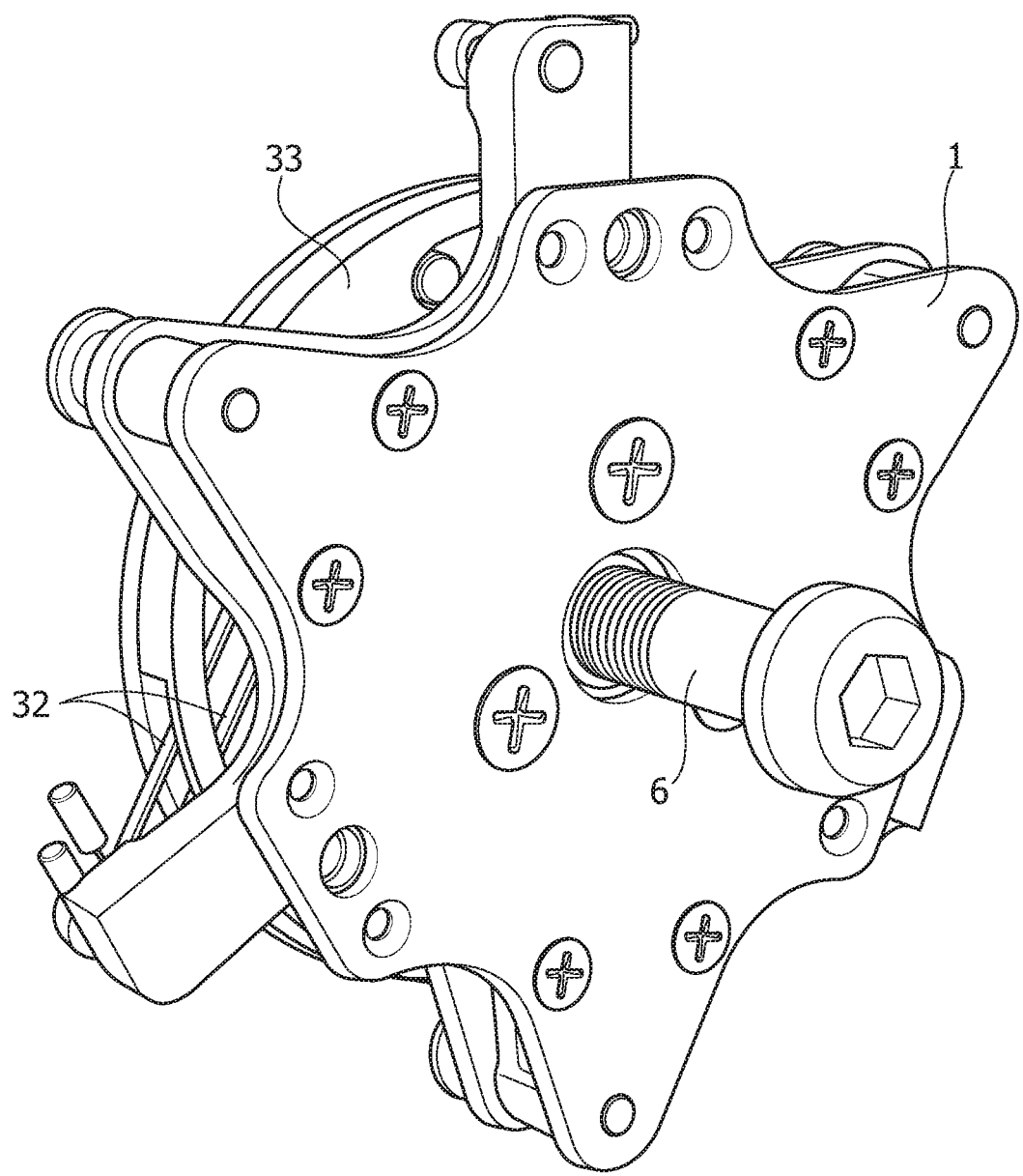
FIGS. 28 and 29 are two front views respectively of FIG. 26 and FIG. 27.
Figure 29:
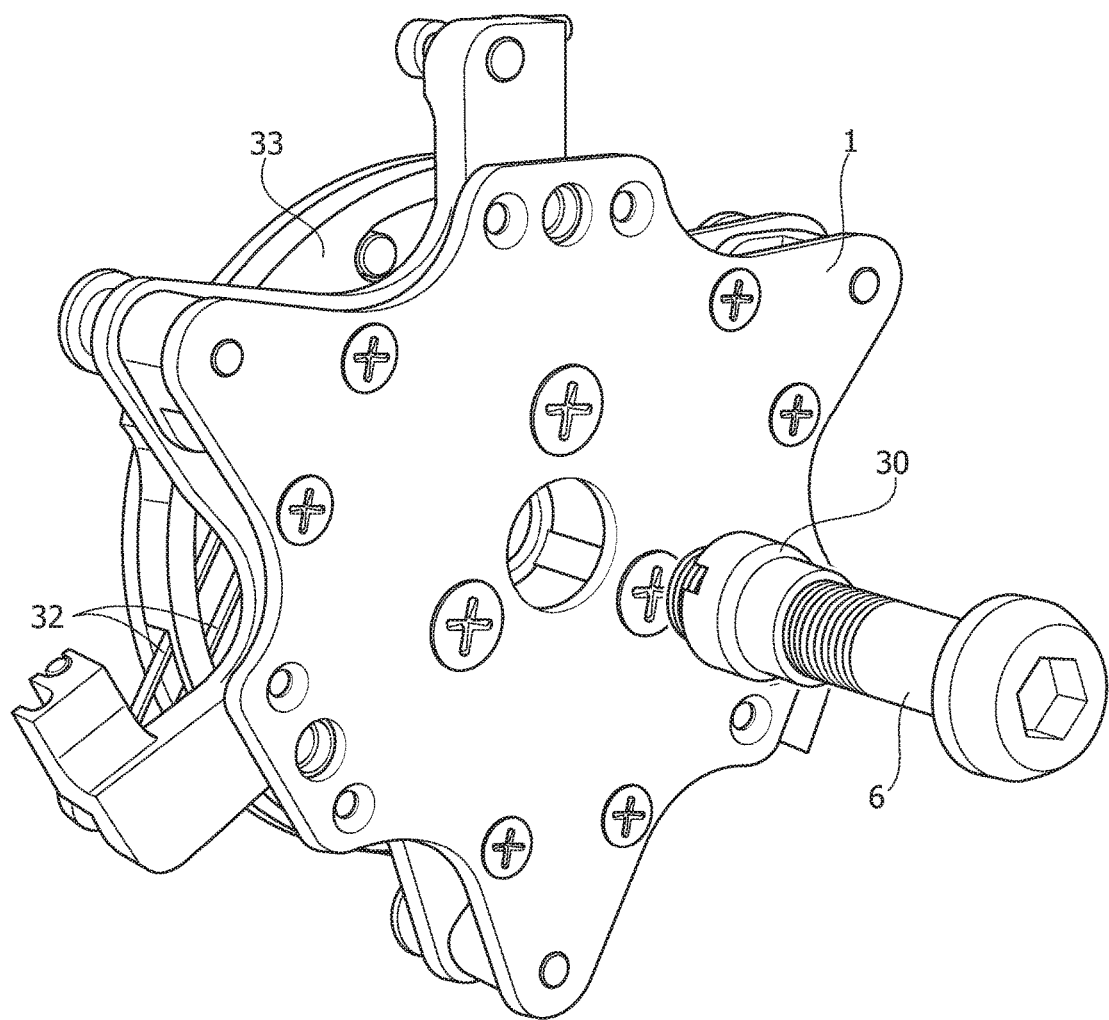

In the case of FIGS. 26, 27 (martensite phase) and 28, 29 (austenite phase) the wires 32 made of shape memory material are instead arranged in a discrete configuration, for example grouped in pairs so as to reduce the number of anchoring points on which the load that generates the rotation of the rotatable ring 33 with respect to the stationary body 34 is exerted.

In any case, considering the same number of wire sections, torque and required travel, the number of shape memory wires 32, the length thereof and the distance thereof with respect to the centre of rotation of the device will preferably be equal in both configurations described above. In addition, in both configurations there will be provided for elastic means not illustrated, for example constituted by one or more helical springs, to guarantee the maintenance of the retaining configuration of the screw 6 in the steps prior to passing to the release configuration.

Actuation by means of shape memory wires is compatible with a high level of repeated actuation capability which is necessary to carry out setting and calibration operations of the device.

The invention claimed is:

1. A device for hold-down and controlled release of space satellites installed on launchers and loads installed on space satellites, comprising:
   a blocking member for the engagement of a screw, said blocking member being made up of segments radially displaceable from a mutually approached retaining position to a mutually spaced-apart release position of the screw,
   actuator means for controlling the radial displacement of said segments from said retaining position to said release position, the actuator means comprising a rotatable element coaxially rotatable with respect to the blocking member,
   an articulated mechanism comprising a plurality of connecting rods and crank units which operatively connect said rotatable element with said segments of the blocking member, and
   drive means for the controlled rotation of said rotatable element and, through said articulated mechanism, the simultaneous displacement of the segments of the blocking member between said retaining and releasing positions.

2. The device according to claim 1, wherein said blocking member consists of a nut whose segments are suitable to directly engage said screw.

3. The device according to claim 1, further comprising an internally threaded bushing fastened on said screw and formed with an outer radial engagement portion, and wherein the segments of said blocking member are suitable to engage said radial engagement portion of said bushing.

4. The device according to claim 1, wherein each connecting rod and crank unit defines a knee connected to said rotatable element.

5. The device according to claim 1, wherein said drive means are linear motors.

6. The device according to claim 5, wherein said rotatable element is an elastic ring forcedly positioned between angularly equally spaced stationary retaining means and said linear motors act so as to exert a radial thrust on said elastic ring between said stationary retaining means to carry out sequential localised micro-deformations thereon.

7. The device according to claim 6, further comprising blocking linear motors acting on the elastic ring, radially arranged at said stationary retaining means and synchronously actuated with said thrust linear motors.

8. The device according to claim 5, wherein said linear motors are of piezoelectric type.

9. The device according to claim 1, wherein said drive means consist of elements made of shape memory material.

10. The device according to claim 9, wherein said rotatable element is a ring and said elements made of shape memory material consist of wires which obliquely interconnect said ring with a stationary body.

11. The device according to claim 10, wherein said wires are made of shape memory material are arranged according to a distributed configuration.

12. The device according to claim 10, wherein said wires are made of shape memory material are arranged according to a discrete configuration in groups.

13. The device according to claim 1, further comprising means for detecting the pre-load of the screw.

14. The device according to claim 2, further comprising means for detecting the pre-load of the screw.

15. The device according to claim 3, further comprising means for detecting the pre-load of the screw.

16. The device according to claim 4, further comprising means for detecting the pre-load of the screw.

17. The device according to claim 5, further comprising means for detecting the pre-load of the screw.

18. The device according to claim 6, further comprising means for detecting the pre-load of the screw.

19. The device according to claim 7, further comprising means for detecting the pre-load of the screw.

20. The device according to claim 8, further comprising means for detecting the pre-load of the screw.

* * * * *